United States Patent

[11] 3,592,079

| | | |
|---|---|---|
| [72] | Inventor | Yoichi Mori<br>Yokohama, Japan |
| [21] | Appl. No. | 871,194 |
| [22] | Filed | Oct. 27, 1969 |
| [45] | Patented | July 13, 1971 |
| [73] | Assignee | Nissan Jidosha Kabushiki Kaisha |

[54] AUTOMATIC SPEED CHANGE GEAR
8 Claims, 30 Drawing Figs.

[52] U.S. Cl. .................................................. 74/688
[51] Int. Cl. ............................................. F16h 47/08
[50] Field of Search .................................... 74/688

[56] References Cited
UNITED STATES PATENTS
2,886,983  5/1959  Miller.......................... 74/688 X
3,411,382  11/1968  Mori............................. 74/688

*Primary Examiner*—Carlton R. Croyle
*Assistant Examiner*—Thomas C. Perry
*Attorney*—Sughrue, Rothwell, Mion, Zinn & Macpeak

ABSTRACT: An automatic speed change gear in 6 to 8 forward stages and one rearward stage of speed reduction ratio, which comprises a hydraulic torque converter and a first and a second planetary gear assemblies. The first planetary gear assembly transmits the power from said torque converter to the second planetary gear assembly in at least three forward stages and a rearward stage. The second planetary gear assembly delivers output power in at least three forward slow speed stage and a rearward stage when it is not coupled with the torque converter, while in at least three forward high speed stages when it is coupled with the torque converter.

AUTOMATIC SPEED CHANGE GEAR

This is a division of application Ser. No. 682,811, filed Nov. 14, 1967, now U.S. Pat. No. 3,482,469.

This invention relates to an automatic speed change gear, more particularly to an automatic speed change gear capable of producing output power in more than six forward stages and one rearward stage of speed change ratio.

In operating machines driven by a prime mover, such as automobiles, at various output speeds, the efficiency of the machine can be kept at the maximum by using a speed change gear having a continuous speed change ratio so as to run the prime mover at the most efficient conditions regardless of the output speed of the machine. Such continuous speed change ratio, however, is not economical to manufacture, and the so-called close ratio multistage speed change gears, such as six or eight stage speed change gears, have been used heretofore. Known multistage speed change gears having more than six stages of speed change ratio are actuated manually or by a separate actuator from the outside. As the available stages of speed change ratio increase, the operation for selecting desired stages becomes complicated, and only very experienced and skillful operators can correctly select the proper operating stage for each running condition. Thus, known multistage speed change gears had a disadvantage in that the operation is complicated and considerable skill is necessary for efficient operation thereof.

An object of the present invention is to obviate such difficulty of conventional multistage speed change gears by providing automatic six and eight stage speed change gears, which are simple in construction and can be manufactured economically.

According to the present invention, there is provided an automatic speed change gear comprising a first planetary gear assembly connected selectively to an input shaft through a torque converter and a clutch means; a second planetary gear assembly connected directly to said first planetary gear assembly through a link means; a first brake means having at least a brake and a one-way clutch, said first brake means adapted to selectively stop selected rotary elements constituting the first planetary gear assembly; a second brake means having at least a brake for stopping a selected rotary element of the second planetary gear assembly; a coupling means to selectively connect said second planetary gear assembly to said input shaft; and an output means connected to said second planetary gear assembly; said first planetary gear assembly adapted to transmit power from said input shaft to said second planetary gear assembly in at least three stages by selectively actuating said first clutch means and said first brake means; said second planetary gear assembly adapted to deliver power to said output means in at least three low speed stages and a rearward stage when said coupling means is not actuated and in at least three high speed stages when said coupling means is actuated by selectively controlling said second brake means.

In a preferred embodiment of the automatic speed change gear according to the present invention, a Ravigneaux-type planetary gear assembly is used as said first planetary gear assembly and said Ravigneaux-type planetary gear assembly is selectively connected to said input shaft through two split routes including a first route having a hydraulic torque converter and a second route having a second clutch means, thereby said second planetary gear assembly produces four low speed change ratios and a rearward speed change ratio when said coupling means is not actuated and four high speed change ratios when said coupling means is actuated. What is meant by the Ravigneaux-type planetary gear assembly is, for instance, the assembly as illustrated in the U.S. Pat. No. 2,239,973, granted to Pol Ravigneaux on Apr. 29, 1941, or the like.

The salient features of the speed change device according to the present invention are as follows.

1. By combination of two planetary gear assemblies, speed change in eight forward stages and one rearward stage of speed change ratio can be achieved with a comparatively simple mechanical structure.
2. By carrying out the switchover between a high speed range and a low speed range with a brake and a clutch, the shifting operative stages can be easily controlled.
3. Speed reduction ratios in the low speed range are distributed sparsely, while speed reduction ratios in the high speed range are distributed densely, and hence, the speed change gear can be operated smoothly.
4. The elements gear trains of the speed change gear of the present invention can be arranged in a number of different ways, and hence, the speed change gear can be mounted on various type vehicles; such as vehicles having engines disposed longitudinally, or transversely; vehicles of front-engine front-drive type, rear-engine rear-drive type, front-engine rear-drive type, and rear-engine front-drive type; and vehicles of all-wheel-drive type or two-wheel drive type. What is meant by "engines disposed longitudinally" are those engines which have the axial centerline thereof disposed in parallel with the travelling direction of vehicles driven by the engines. What is meant by "engines disposed transversely" are those engines which have the axial centerline thereof disposed transversely with respect to the travelling direction of vehicles driven by the engines.

For a better understanding of the invention, reference is now made to the accompanying drawings, in which.

Like parts are shown by like numerals and symbols throughout the drawings.

Figure 1:
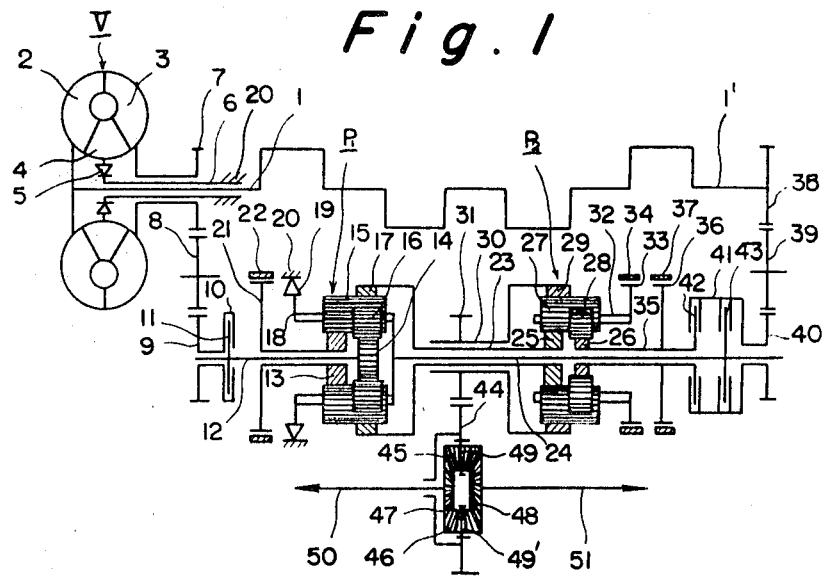
FIG. 1 is a skeleton diagram of a first embodiment of the automatic speed change gear according to the present invention, which uses two Ravigneaux-type planetary gear assemblies and connects to an engine disposed transversely.

Referring to FIG. 1, illustrating a first embodiment of the speed change gear according to the present invention, the crankshaft 1 of an engine, or the output shaft of a prime mover, is connected to a torque converter V. The torque converter used in this embodiment comprises a pump 2 connected to the crankshaft 1, a turbine 3, a stator 4, and a one-way clutch 5 supported by a hollow sleeve 6 extending from a case 20 of the speed change gear. A train of transmission gears 7, 8, and 9 transmits the engine output power to a first planetary gear assembly $P_1$. In this particular embodiment of the invention, the engine output power is delivered to the speed change gear through two split routes; namely the aforesaid transmission gear train 7 to 9 issuing from the torque converter V and another gear train 38, 39, and 40 connected to the opposite end of the crankshaft 1.

Figure 3:
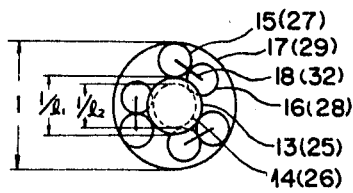
FIG. 3 is a diagrammatic illustration of a Ravigneaux-type planetary gear assembly usable in the speed change gears of FIGS. 1 and 2, shown in pitch circles of elementary gears of the assembly.

The transmission gear 9 is joined to a clutch body 10 engageable with a clutch plate 11, which is in turn connected to a transmitting shaft 12 extending to a first planetary gear assembly $P_1$. The first planetary gear assembly $P_1$ of this embodiment is of Ravigneaux type and comprises a first sun gear 13 having a drum 21 engageable with a brake 22, a second sun gear 14 connected to the transmitting shaft 12, first planet gears 15 engaged with the first sun gear 13, second planet gears 16 engaged with both the second sun gear 14 and the first planet gears 15, a ring gear 17 engaged with the first planet gears 15, and a carrier 18 to carry the first and second planet gears 15 and 16 in rotatable fashion. FIG. 3 shows the manner in which various elementary gears of the Ravigneaux-type planetary gear assembly $P_1$ are meshed with each other.

A one-way clutch 19 is connected to the carrier 18 so as to allow normal rotation of the carrier but not reverse rotation thereof. What is meant by the normal rotation is that rotation which is in the same direction as that of the crankshaft 1, the pump 2, the turbine 3, or the transmission gear 9; and what is meant by the reverse rotation is that rotation which is in the opposite direction to the normal relation.

The brake 22 and other brakes to be described hereinafter can be of any suitable type, e.g. band brakes, disc brakes, and the like.

A hollow shaft 23 transmits the output power from the first planetary gear assembly $P_1$ to a second planetary gear assembly $P_2$, which is also of the Ravigneaux type in this particular embodiment. A solid shaft 24 is joined to the carrier 18 to transmit the engine output power to the first planetary gear assembly $P_1$ from the opposite end 1' thereof through a clutch means to be described hereinafter.

The second planetary gear assembly $P_2$ comprises a first sun gear 25 connected to the hollow shaft 23, a second sun gear 26 connected to a hollow shaft 35, first planet gears 27 meshed with the first sun gear 25, second planet gears 28 meshed with both the second sun gear 26 and the first planet gears 27, a ring gear 29 meshed with the first planet gears 27, and a carrier 32 to hold the first and second planet gears 27 and 28 in a rotatable manner. FIG. 3 also shows the relationship between various elementary gears of the second planetary gear assembly $P_2$. The carrier 32 is connected to a drum 33 engageable with a brake 34, and the hollow shaft 35 has a drum member 36 engageable with another brake 37.

A clutch body 41 is joined with the transmission gears 40 of the gear train connected to the end 1' of the engine crankshaft 1. A clutch plate 42 connected to the hollow shaft 35 is engageable with the clutch body 41 to deliver the power from the crankshaft 1' to the second sun gear 26 of the second planetary gear assembly $P_2$. Another clutch plate 43 connected to the transmission shaft 24 is engageable with the clutch body 41 to transmit the power to the carrier 18 of the first planetary gear assembly $P_1$.

An output gear wheel 44 is meshed with an output pinion 31 connected to the ring gear 29 of the second planetary gear assembly $P_2$ through a hollow shaft 30. A pair of bevel pinions 45 and 46 are mounted on the pins 49 and 49', respectively, which pins are secured to the gear wheel 44. The bevel pinions 45, 46 rotate around the pins 49, 49' to transmit the power to side gears 47 and 48 connected to axles 50 and 51, respectively. The gears 45, 46, 47, and 48 constitute a differential gear means.

The embodiment shown in FIG. 1 is mounted on a vehicle having the engine crankshaft 1 disposed transverse to the travelling direction of the vehicle, and each axle 50 or 51 has a driving wheel (not shown) at the tip end thereof. The position of the output gear wheel 44 is selected to be substantially at the middle of the crankshaft 1 to facilitate effective power transmission to the side wheels for driving a vehicle.

Prior to entering into the detailed description of the operation of the speed change gear in each stage of speed reduction ratio, the following symbols are assumed to designate the revolving speed of various elements of the speed change gear:

In the first planetary gear assembly;
R : Revolving speed of the ring gear 17
$S_1$: Revolving speed of the first sun gear 13
$S_2$: Revolving speed of the second sun gear 14
C: Revolving speed of the carrier 18

$$l_1 = \frac{\text{Pitch circle radius of the ring gear 17}}{\text{Pitch circle radius of the first sun gear 13}}$$

$$l_2 = \frac{\text{Pitch circle radius of the ring gear 17}}{\text{Pitch circle radius of the second sun gear 14}}$$

In the second planetary gear assembly;
R': Revolving speed of the ring gear 29
$S_1'$: Revolving speed of the first sun gear 35
$S_2'$: Revolving speed of the second sun gear 26
C': Revolving speed of the carrier 32

$$l_1' = \frac{\text{Pitch circle radius of the ring gear 29}}{\text{Pitch circle radius of the first sun gear 25}}$$

$$l_2' = \frac{\text{Pitch circle radius of the ring gear 29}}{\text{Pitch circle radius of the second sun gear 26}}$$

Then, there are following relationship between the revolving speeds of constituent gears of the speed change gear of FIG. 1.

$(l_1+1)C = l_1R + S_1$    (1)
$(l_2-1)C = l_2R - S_2$    (2)
$(l_1'+1)C' = l_1'R' + S_1'$    (3)
$(l_2'-1)C' = l_2'R' - S_2'$    (4)
$S_1' = R$    (5)

Now, let it be assumed that the revolving speed of the crankshaft 1, or transmission gears 9 and 40, be a unit speed $U=1$. Then, since the output speed is represented by the revolving speed $R'$ of the ring gear 29 of the second planet; gear assembly $P_2$, the speed reduction ratio $M$ can be given by
$M = 1/R'$    (6)

The operative conditions of various clutches and brakes in each operative stage are shown in Table 2. If the revolving speed of those elements which rotate at the same speed as that of the crankshaft 1 is represented by "1," and that of those elements which are held stationary by the brakes is represented by "0," then the specific revolving speeds of the various rotary elements of the speed change device in each operative stage can be summarized as shown in Table 1.

As shown in Tables 1 and 2, the speed change device can be operated in eight forward stages, including four stages L-1, L-2, L-3, L-4 in low speed range, and four stages H-1, H-2, H-3, H-4 in high speed range, as well as in a rearward stage. The switchover between the high speed and low speed range is made by manually or automatically controlling the brake 37 and the clutch 41, 42. The shift of stages in each high speed or low speed ranged is done by a suitable hydraulic control means (not shown).

As a numerical example, speed reduction ratios in each operative stage of the speed change device are calculated by assuming $l_1=2.0$, $l_2=2.5$, $l_1'=2.0$, $l_2'=3.0$, and the results are shown in Table 2.

Formulas to represent speed reduction ratio in each operative stage will now be derived.

First stage (L-1):

In this stage, $C=0$, $S_2=1$, and $S_2'=0$.

From formula (2), one obtains $R=1/l_2$. By eliminating $C'$ from the formulas (3) and (4) and substituting the formula (5), the output speed is given as follows.

$$R' = \frac{R(l_2'-1) + S_2'(l_1'+1)}{l_1'+l_2'} = \frac{(l_2'-1)}{l_2(l_1'+l_2')} \quad (7)$$

Accordingly, $$M = \frac{l_2(l_1'+l_2')}{(l_2'-1)} = \frac{2.5 \times 5}{2} = 6.25$$

Second stage (L-2):

In this stage, $S_1=0$, $S_2=1$, and $S_2'=0$.

By eliminating $C$ from the formulas (1) and (2), $R$ is given by $$R = \frac{S_1(l_2-1) + S_2(l_1+1)}{l_1+l_2} = \frac{(l_1+1)}{l_2+l_2} \quad (8)$$

By substituting the above relation to the formula (7), one obtains the following relations.

$$R' = \frac{(l_1+1)(l_2'-1)}{(l_1+l_2)(l_1'+l_2')}$$

$$M = \frac{(l_1+l_2)(l_1'+l_2')}{(l_1+1)(l_2'-1)} = \frac{4.5 \times 5}{3 \times 2} = 3.75$$

Third stage (L-3):

In this stage, $S_2=1$, $C=1$, and $S_2'=0$.

TABLE 1

| | Revolving speed | | | | | | | |
|---|---|---|---|---|---|---|---|---|
| | First planetary gear assembly P₁ | | | | Second planetary gear assembly P₂ | | | |
| Operative stage | First sun gear 13 ($S_1$) | Second sun gear 14 ($S_2$) | Carrier 18 (C) | Ring gear 17 (R) | First sun gear 25 ($S_1'$) | Second sun gear 26 ($S_2'$) | Carrier 32 (C') | Ring gear 29 (R') |
| L-1 | | 1 | 0 | $R=S_1'$ | | 0 | | |
| L-2 | 0 | | 1 | $R=S_1'$ | | 0 | | |
| L-3 | | 1 | 1 | $R=S_1'$ | | 0 | | |
| L-4 | 0 | | 1 | $R=S_1'$ | | 0 | | |
| H-1 | | 1 | 0 | $R=S_1'$ | | 1 | | |
| H-2 | 0 | | 1 | $R=S_1'$ | | 1 | | |
| H-3 | | 1 | 1 | $R=S_1'$ | | 1 | | |
| H-4 | 0 | | 1 | $R=S_1'$ | | 1 | | |
| Rearward | | 1 | 0 | $R=S_1'$ | | | 0 | |

TABLE 2

| | | | | | | | | Speed reduction ratio | |
|---|---|---|---|---|---|---|---|---|---|
| Operative stage | Brake 22 | Clutch 10, 11 | One-way clutch 19 | Clutch 41, 43 | Brake 37 | Clutch 41, 42 | Brake 34 | Formula | Numeric example $l_1=2.0, l_2=2.5$ $l_1'=2.0, l_2'=3.0$ |
| L-1 | | Engaged | Actuated | | Actuated | | | $l_2(l_1'+l_2')/(l_2'-1)$ | 6.25 |
| L-2 | Actuated | | do | | do | | | $(l_1+l_2)(l_1'+l_2')/(l_1+1)(l_2'-1)$ | 3.75 |
| L-3 | | | do | Engaged | do | | | $(l_1'+l_2')/(l_2'-1)$ | 2.50 |
| L-4 | Actuated | | | do | do | | | $l_1(l_1'+l_2')/(l_1+1)(l_2'-1)$ | 1.66 |
| H-1 | | Engaged | Actuated | | | Engaged | | $(l_1'+l_2')/\{l_2'-1+l_2(l_1'+1)\}$ | 1.312 |
| H-2 | Actuated | | do | | | do | | $\dfrac{(l_1'+l_2')(l_1+l_2)}{(l_1+1)(l_2'-1)+(l_1+l_2)(l_1'+1)}$ | 1.154 |
| H-3 | | | do | Engaged | | do | | 1 | 1.00 |
| H-4 | Actuated | | | do | | do | | $\dfrac{(l_1'+l_2')l_1}{(l_1+1)(l_2'-1)+l_1(l_1'+1)}$ | 0.832 |
| Rearward | | Engaged | Actuated | | | | Actuated | $-l_2l_1'$ | -5.00 |

Accordingly,
$R=(l_2-1+1)/l_2=1$

By substituting to the formula (7), one obtains the following relations.

$$R' = \frac{l_2'-1}{l_1'+l_2'}$$

$$M = \frac{l_1'+l_2'}{l_2'-1} = 5/2 = 2.5$$

Fourth stage (L–4):
In this stage, $S_1=0$, $C=1$, and $S_2'=0$.
Accordingly,
$R=(l_1+1)/l_1$ By substituting the above formula to the formula (7), one obtains the following relations.

$$R' = \frac{(l_1+1)(l_2'-1)}{(l_1'+l_2')l_1}$$

$$M = \frac{l_1(l_1'+l_2')}{(l_1+1)(l_2'-1)} = \frac{2\times 5}{3\times 2} = 1.66$$

Fifth stage (H–1):
In this stage, $S_2=1$, $C=0$, and $S_2'=1$.
Accordingly,
$R=1/l_2$ By substituting the above relation to the formula (7), one obtains the following relations.

$$R' = \frac{l_2'-1+l_2(l_1'+1)}{(l_1'+l_2')l_2}$$

$$M = \frac{(l_1'+l_2')l_2}{l_2'-1+l_2(l_1'+1)} = \frac{5\times 2.5}{2+2.5\times 3} = 1.312$$

Sixth stage (H–2):
In this stage, $S_1=0$, $S_2=1$, and $S_2'=1$.
Accordingly,
$R=(l_1'+1)/(l_1+l_2)$ By substituting the above relation to the formula (7), one obtains the following relations.

$$R' = \frac{(l_1+1)(l_2'-1)+(l_1+l_2)(l_1'+1)}{(l_1'+l_2')(l_1+l_2)}$$

$$M = \frac{(l_1'+l_2')(l_1+l_2)}{(l_1+1)(l_2'-1)+(l_1+l_2)(l_1'+1)} = \frac{5\times 4.5}{3\times 2+4.5\times 3} = 1.154$$

Seventh stage (H–3):
In this stage, $S_2=1$, $C=1$, and $S_2'=1$.
Accordingly,
$R=l_2/l_2=1$ By substituting $R=1$ to the formula (7), one obtains the following relations.
$R'=(l_2'-1+l_1'+1)/(l_1'+l_2')$
$=(l_2'+l_1')/(l_1'+l_2')=1$
$M=1$ Eighth stage (H–4):
In this stage, $S_1=0$, $C=1$, and $S_2'=1$.
Accordingly,
$R=(l_1+1)/l_1$ By substituting the above relation to the formula (7), one obtains the following relations.

$$R' = \frac{(l_1+1)(l_2'-1)+l_1(l_1'+1)}{(l_1'+l_2')l_1}$$

$$M = \frac{(l_1'+l_2')l_1}{(l_1+1)(l_2'-1)+l_1(l_1'+1)} = \frac{5\times 2}{3\times 2+2\times 3} = 0.832$$

Rearward stage:
In this stage, $S_2=1$, $C=0$, and $C'=0$.
Accordingly,
$R=1/l_2(=S_1')$ Substituting the above relation to the formula (3), one obtains the following relations.
$R'=-1/l_1'l_2$
$M=-l_1'l_2=2\times 2.5=5$ In short, with the speed change device according to the present invention, the output pinion 31 can be run at eight different forward stages and a rearward stage of speed reduction ratio for a certain revolving speed of the engine crankshaft 1 by selectively actuating various clutches and brakes by suitable hydraulic control means (not shown) or the like. Thus, the axles 50 and 51 are also driven at the same stage of speed reduction ratio as the output pinion 31, and the engine output power is transmitted to the wheels through the speed change gear so as to drive the wheels at eight different forward stages of speed reduction ratio and one rearward stage thereof.

Figure 2:
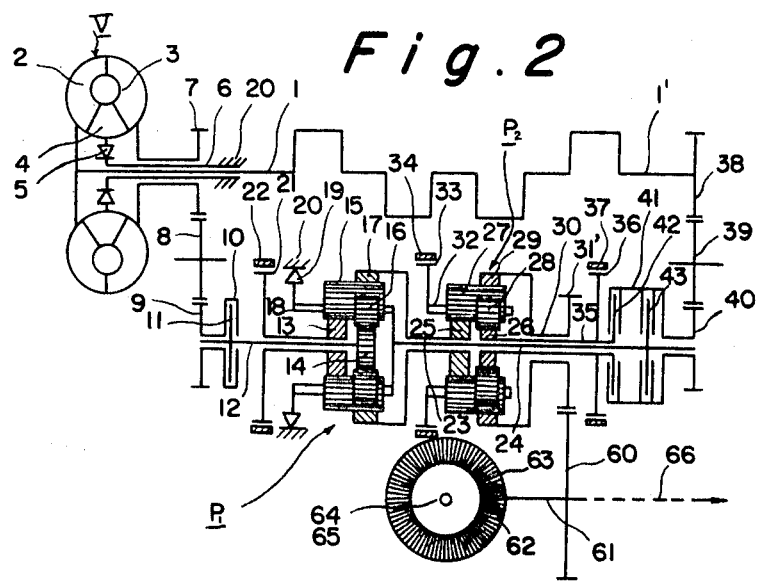
FIG. 2 is a skeleton diagram of modification the speed change gear of FIG. 1, which connects to an engine disposed longitudinally.

FIG. 2 shows a modification of the device of FIG. 1, which can be applied advantageously to a vehicle having an engine disposed longitudinally. Since the construction of the gear trains in the device of FIG. 2 is essentially the same as that of FIG. 1, only those parts which are different from first embodiment of FIG. 1 will be described. An output pinion 31' of this modification meshes with an output transmission gear wheel 60 having transmission shafts 61 and 66 connected thereto for delivering power to front and rear wheels. If the vehicle is of all-wheel drive type, both shafts are used, but if it is of two-wheel drive type, only one of the transmission shafts is used. A pinion 62 connected to the transmission shaft 61 and a bevel gear wheel 63 constitute a reduction bevel gear assembly. The bevel gear wheel 63 drives axles 64 and 65 through a differential gear means (not shown) located at the central portion of the gear wheel 63. Each axle 64 or 65 has a driving wheel (not shown) secured at the outer end thereof to drive the vehicle. The other transmission shaft 66 works in the same manner as the transmission shaft 61, when it is used.

Figure 4:
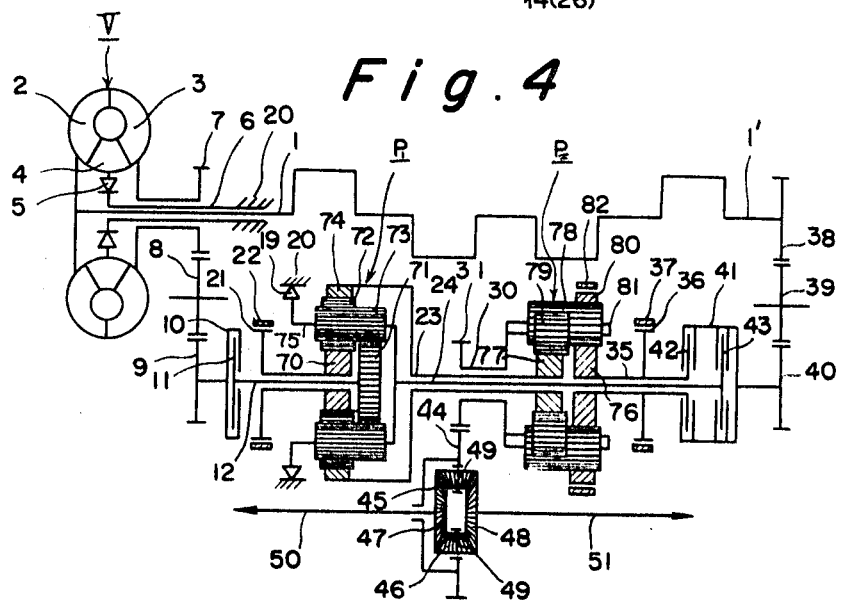
FIG. 4 is a skeleton diagram of another modification of the first embodiment, in which the output power issues from the carrier of a second planetary gear assembly.
Figure 5:
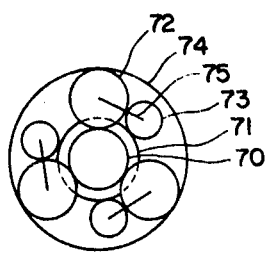
FIGS. 5 and 6 are diagrammatic illustrations of a Ravigneaux-type planetary gear assemblies usable in the speed change gear of FIG. 4, shown in pitch circle of the elementary gears thereof.

FIG. 4 shows another modification of the speed change device of FIG. 1, in which relative dimensions of elementary gears in each planetary gear assembly are different from those of FIG. 1 and the output power of the device issues from the carrier of a second planetary gear assembly. As shown in FIG. 5, a first planetary gear assembly $P_1$ of this modification comprises a sun gear 70 having a drum 21 engageable with a brake 22, a second sun gear 71 connected to a clutch plate 11, planet gears 72 meshed with said first sun gear 70, second planet gears 73 meshed with both said second sun gear 71 and said first planet gears 72, a ring gear 74 meshed with said first planet gears 72, and a carrier 75 carrying said first and second planet gears 72 and 73 in rotatable fashion. One end of the carrier 75 is connected to a one-way clutch 19 supported by a case 20 of the device, while the opposite end of the carrier is connected to a transmission shaft 24 leading to a clutch plate 43.

Figure 6:
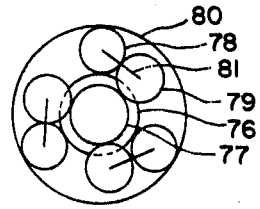

As shown in FIG. 6, the second planetary gear assembly $P_2$ of this modification comprises a first sun gear 76 connected to a clutch plate 42, through a hollow shaft 35, a second sun gear 77 connected to the ring gear 74 of the first planetary gear assembly $P_1$, first planet gears 78 meshed with the first sun gear 76, second planet gears 79 meshed with both the second sun gear 77 and the first planet gears 78, a ring gear 80 meshed with said first planet gears 78 and engageable with a brake 82, and a carrier 81 carrying said first and second planet gears 78 and 79 in rotatable fashion and having an output pinion 31 connected thereto through a hollow shaft 30. The hollow shaft 35 has a drum 36 engageable with a brake 37 adapted to stop the first sun gear 76.

Let it be assumed that the revolving speed of each rotary element of the planetary gear assemblies $P_1$ and $P_2$ and the relative pitch circle radii thereof of this modification can be represented by the corresponding notations described hereinbefore referring to the first embodiment as depicted in FIG. 1. Then, there are the following relations between such revolving speeds and relative radii.

$(l_1+1)C=l_1R+S_1$     (1)

$(l_2-1)C = l_2 R - S_2$  (2)
$(l_1'+1)C' = l_1' R' + S_1'$  (3)
$(l_2'-1)C' = l_2' R' - S_2'$  (4)
$S_2' = R$  (10)
$M = 1/C'$  (11)

The operative conditions of various clutches and brakes of this modification in each operative stage thereof are shown in Table 4.

If the revolving speed of those elements which rotate at the same speed as that of the crankshaft 1 is represented by "1," and that of those elements which are held stationary by the brakes is represented by "0," then the specific revolving speeds of the various rotary elements of the speed change device of FIG. 4 in each operative stage can be summarized as shown in Table 3.

TABLE 3

| Operative stage | Revolving speed |||||||
|---|---|---|---|---|---|---|---|
| | First planetary gear assembly $P_1$ |||| Second planetary gear assembly $P_2$ |||
| | First sun gear 70 ($S_1$) | Second sun gear 71 ($S_2$) | Carrier 75 (C) | Ring gear 74 (R) | Second sun gear 77 ($S_2'$) | First sun gear 76 ($S_1'$) | Ring gear 80 ($R'$) | Carrier 81 ($C'$) |
| L-1 | | 1 | 0 | $R = S_1'$ | | 0 | | |
| L-2 | 0 | 1 | | | $R = S_1'$ | 0 | | |
| L-3 | | 1 | 1 | $R = S_1'$ | | 0 | | |
| L-4 | 0 | | | 1 | $R = S_1'$ | 0 | | |
| H-1 | | 1 | 0 | $R = S_1'$ | | 1 | | |
| H-2 | 0 | 1 | | | $R = S_1'$ | 1 | | |
| H-3 | | 1 | 1 | $R = S_1'$ | | 1 | | |
| H-4 | 0 | | | 1 | $R = S_1'$ | 1 | | |
| Rearward | | 1 | 0 | $R = S_1'$ | | | 0 | |

TABLE 4

| Operative stage | Brake 22 | Clutch 10, 11 | One-way clutch 19 | Clutch 41, 43 | Brake 37 | Clutch 41, 42 | Brake 82 | Formula | Speed reduction ratio, Numeric example $l_1=2.6, l_2=2.2$ $l_1'=2.2, l_2'=2.6$ |
|---|---|---|---|---|---|---|---|---|---|
| L-1 | | Engaged | Actuated | | Actuated | | | $l_2(l_1'+l_2')/l_1'$ | 4.80 |
| L-2 | Actuated | do | | | do | | | $(l_1'+l_2)(l_1'+l_2')/l_1'(l_1+1)$ | 2.91 |
| L-3 | | do | | Engaged | do | | | $(l_1'+l_2')/l_1'$ | 2.18 |
| L-4 | Actuated | | | do | do | | | $l_1(l_1'+l_2')/(l_1+1)l_1'$ | 1.57 |
| H-1 | | Engaged | Actuated | | | | Engaged | $(l_1'+l_2')l_2/(l_1'+l_2l_2')$ | 1.33 |
| H-2 | Actuated | do | | | | | do | $\dfrac{(l_1'+l_2')(l_1+l_2)}{l_1'(l_1+1)+l_2'(l_1+l_2)}$ | 1.13 |
| H-3 | | do | | Engaged | | | do | 1 | 1.00 |
| H-4 | Actuated | | | do | | | do | $\dfrac{(l_1'+l_2')l_1}{l_1'(l_1+1)+l_1l_2'}$ | 0.85 |
| Rearward | | Engaged | Actuated | | | | Actuated | $l_2(l_2'-1)$ | -3.52 |

As a numerical example, speed reduction ratios in each operative stage of the speed change device are calculated by assuming $l_1=2.6$, $l_2=2.2$, $l_1'=2.2$, and $l_2'=2.6$, and the results are shown in Table 4.

Formulas to represent speed reduction ratios in each operative stage will now be derived.

First stage (L-1):
In this stage, $S_2=1$, $C=0$, and $S_1'=0$.

$$C' = \frac{l_1'}{l_1'+l_2'} \times \frac{1}{l_2}$$

$$M = \frac{l_2(l_1'+l_2')}{l_1'} = \frac{2.2 \times 4.8}{2.2} = 4.8$$

Second stage (L-2):
In this stage, $S_1=0$, $S_2=1$, and $S_1'=0$.

$$C' = \frac{l_1'}{l_1'+l_2'} \times \frac{l_1+1}{l_1+l_2}$$

$$M = \frac{(l_1'+l_2')(l_1+l_2)}{l_1'(l_1+1)} = \frac{4.8 \times 4.8}{2.2 \times 3.6} = 2.91$$

Third stage (L-3):
In this stage, $S_2=1$, $C=1$, and $S_1'=0$.

$$C' = \frac{l_1'}{l_1'+l_2'}$$

$$M = \frac{l_1'+l_2'}{l_1'} = \frac{4.8}{2.2} = 2.18$$

Fourth stage (L-4):
In this stage, $S_1=0$, $C=1$, and $S_1'=0$.

$$C' = \frac{l_1'}{l_1'+l_2'} \times \frac{l_1+1}{l_1}$$

$$M = \frac{(l_1'+l_2')l_1}{l_1'(l_1+1)} = \frac{4.8 \times 2.6}{2.2 \times 3.6} = 1.57$$

Fifth stage (H-1):
In this stage, $S_2=1$, $C=0$, and $S_1'=1$.

$$C' = \frac{1}{l_1'+l_2'} \times \frac{l_1'+l_2l_2'}{l_2}$$

$$M = \frac{(l_1'+l_2')l_2}{l_1'+l_2l_2'} = \frac{4.8 \times 2.2}{2.2+2.2 \times 2.6} = 1.33$$

Sixth stage (H-2):
In this stage, $S_1=0$, $S_2=1$, and $S1'=1$.

$$C' = \frac{1}{l_1'+l_2'} \times \frac{l_1'(l_1+1)+l_2'(l_1+l_2)}{l_1+l_2}$$

$$M = \frac{(l_1'+l_2')(l_1+l_2)}{l_1'(l_1+1)+l_2'(l_1+l_2)} = \frac{4.8 \times 4.8}{2.2 \times 3.6+2.6 \times 4.8} = 1.13$$

Seventh stage (H-3):
In this stage, $S_2=1$, $C=1$, and $S_1'=1$.
$C'=1$
$M=1$

Eighth stage (H-4):
In this stage, $S_1=0$, $C=1$, and $S_1'=1$ $$C' = \frac{1}{l_1'+l_2'} \times \frac{l_1'(l_1+1)+l_1l_2'}{l_1}$$

$$M = \frac{l_1(l_1'+l_2')}{l_1'(l_1+1)+l_1l_2'} = \frac{2.6 \times 4.8}{2.2 \times 3.6 + 2.6 \times 2.6} = 0.85$$

Rearward stage:
In this stage, $S_2=1$, $C=0$, and $R'=0$.

$$C' = \frac{-1}{l_2(l_2'-1)}$$

The feature of this modification is in the fact that the speed reduction ratio is concentrated in a comparatively narrow range.

Figure 7:
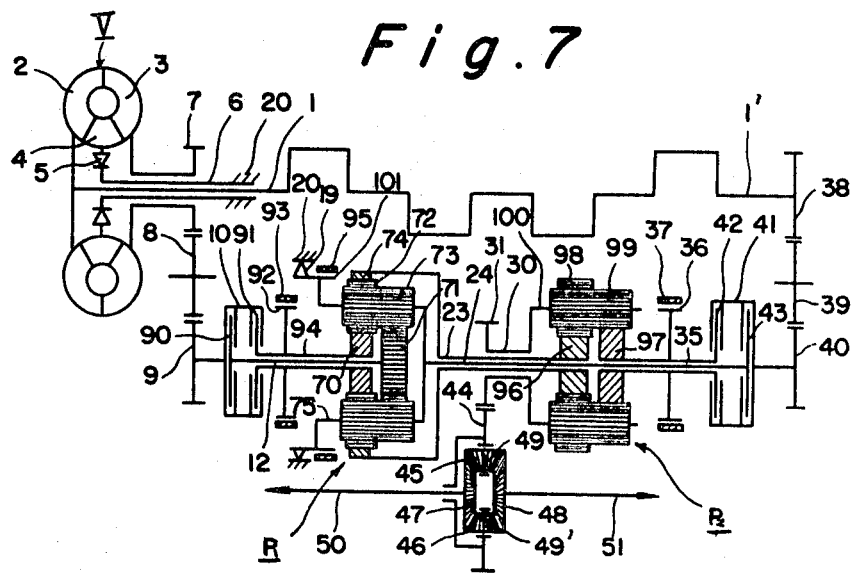
FIG. 7 is a skeleton diagram of a modification of the first embodiment of the invention, in which the ring gear of a second Ravigneaux-type planetary gear assembly is removed.
Figure 8:
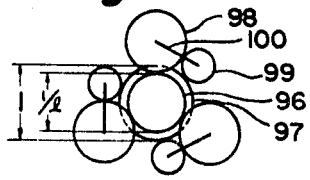
FIG. 8 is a diagrammatic illustration of the second Ravigneaux-type planetary gear assembly of the device of FIG. 7, which does not have any ring gear.

FIG. 7 shows another modification of the first embodiment, in which the construction of the first planetary gear assembly is identical with that of the device of FIG. 4, but the arrangement of the brake and clutches related to it is different. The second planetary gear assembly of this modification is unique by not having any ring gear. As shown in FIG. 8, the second planetary gear assembly comprises first and second sun gears 96, 97, first and second planet gears 98, 99, and a carrier 100 carrying the planet gears in a rotatable manner. The first planetary gear assembly produces four stages of speed reduction ratio and a rearward speed reduction ratio, while the second planetary gear assembly converts the four stages of forward speed reduction ratio into eight stages and modify the rearward speed reduction ratio. An output pinion 31 is connected to the carrier 100 of the second planetary gear assembly through a hollow shaft 30. The difference of this modification from the device of FIG. 4 will now be described.

In FIG. 7, a clutch plate 90 connects selectively a second sun gear 71 of the first planetary gear assembly $P_1$ to an input shaft through a clutch body 10. Another clutch plate 91 connects selectively a first sun gear 70 of the same planetary gear assembly to the input shaft through a hollow shaft 94 and the clutch body 10. A drum 92 is secured to the hollow shaft 94, and a brake 93 is engageable with the drum 92 to selectively stop the first sun gear 70. Another drum 101 is connected to both a carrier 75 and a one-way clutch 19, and the drum is also engageable with a brake 95.

Let it be assumed that each rotary element of the first planetary gear assembly $P_1$ is represented by the same symbols as those for the corresponding rotary element of the device of FIG. 4. In the second planetary gear assembly, the following symbols are assumed.
$S_1'$: Revolving speed of the first sun gear 96
$S_2'$: Revolving speed of the second sun gear 97
$C'$: Revolving speed of the carrier 100

$l$ Pitch circle radius of the second sun gear 97
Pitch circle radius of the first sun gear 96

Then, there are the following relations among the revolving speeds of the rotary elements of the device of FIG. 7.

$(l_1+1)C=l_1R+S_1$  (1)
$(l_2-1)C=l_2R-S_2$  (2)
$(l+1)C'=lS_2'+S_1'$  (13)
$S_1'=R$  (12)
$M=1/C'$  (11)

The operative conditions of various clutches and brakes for each operative stage are shown in Table 6. If the revolving speed of those elements which rotate at the same speed with the crankshaft 1 is represented by "1," and that of those elements which are held stationary by the brake is represented by "0," then the specific revolving speeds of various rotary elements of the speed change device in each operative stage can be summarized as shown in Table 5.

TABLE 5

| | Revolving speed | | | | | | |
|---|---|---|---|---|---|---|---|
| | First planetary gear assembly $P_1$ | | | | Second planetary gear assembly $P_2$ | | |
| Operative stage | First sun gear 70 ($S_1$) | Second sun gear 71 ($S_2$) | Carrier 75 (C) | Ring gear 74 (R) | First sun gear 96 ($S_1'$) | Second sun gear 97 ($S_2'$) | Carrier 100 (C') |
| L-1 | | 1 | 0 | $R=S_1'$ | | 0 | |
| L-2 | 0 | 1 | | $R=S_1'$ | | 0 | |
| L-3 | | 1 | 1 | $R=S_1'$ | | 0 | |
| L-4 | 0 | | 1 | $R=S_1'$ | | 0 | |
| H-1 | | 1 | 0 | $R=S_1'$ | | 1 | |
| H-2 | 0 | 1 | | $R=S_1'$ | | 1 | |
| H-3 | | 1 | 1 | $R=S_1'$ | | 1 | |
| H-4 | 0 | | 1 | $R=S_1'$ | | 1 | |
| Rearward | 1 | | 0 | $R=S_1'$ | | 0 | |

As a numerical example, speed reduction ratios in each operative stage of the speed change device of FIG. 7 are calculated by assuming $l_1=2.6$, $l_2=2.2$, and $l=1.18$, and the results are shown in Table 6.

Formulas to represent the speed reduction ratios in each operative stage will now be derived.

First stage (L-1):
In this stage, $S_2=1$, $C=0$, and $S_2'=0$.

$$C' = \frac{1}{l_2(l+1)}$$

$M=l_2(l+1)=2.2 \times 2.18=4.80$

Second stage (L-2):
In this stage, $S_1=0$, $S_2=1$, and $S_2'=0$.

$$C' = \frac{l_1+1}{l_1+l_2} \times \frac{1}{l+1}$$

$$M = \frac{(l_1+l_2)(l+1)}{(l_1+1)} = \frac{4.8 \times 2.18}{3.6} = 2.91$$

TABLE 6

| Operative stage | Brake 95 | Brake 93 | Clutch 10, 90 | One-way clutch 19 | Clutch 41, 43 | Brake 37 | Clutch, 41, 42 | Clutch 10, 91 | Formula | Speed reduction rate — Numeric example $l_1=2.6$, $l_2=2.2$, $l=1.18$ |
|---|---|---|---|---|---|---|---|---|---|---|
| L-1 | Actuated | | Engaged | Actuated | | Actuated | | | $l_2(l+1)$ | 4.80 |
| L-2 | | Actuated | do | | | do | | | $(l_1+l_2)(l+1)/(l_1+1)$ | 2.91 |
| L-3 | | | do | | | do | | | $l+1$ | 2.18 |
| L-4 | | Actuated | | | Engaged | do | | | $l_1(l+1)/(l_1+1)$ | 1.56 |
| H-1 | Actuated | | Engaged | Actuated | | do | do | Engaged | $l_2(l+1)/(1+ll_2)$ | 1.33 |
| H-2 | | Actuated | do | | | | do | | $\frac{(l_1+l_2)(l+1)}{l_1+1+l(l_1+l_2)}$ | 1.13 |
| H-3 | | | do | | Engaged | | do | | 1 | 1.00 |
| H-4 | | Actuated | | | do | | do | | $\frac{l_1(l+1)}{(l+1)ll_1}$ | 0.85 |
| Rearward | Actuated | | | | | Actuated | | Actuated | $-l_1(l+1)$ | -5.66 |

Third stage (L-3):
In this stage, $S_2=1$, $C=1$, and $S_2'=0$.

$$C' = \frac{1}{l+1}$$

$$M = l+1 = 2.18$$

Fourth stage (L-4):
In this stage, $S_1=0$, $C=1$, and $S_2'=0$.

$$C' = \frac{(l_1+1)}{l_1} \times \frac{1}{l+1}$$

$$M = \frac{l_1(l+1)}{l_1+1} = \frac{2.6 \times 2.18}{3.6} = 1.56$$

Fifth stage (H-1):
In this stage, $S_2=1$, $C=0$, and $S_2'=1$.

$$C' = \frac{\frac{1}{l_2}+l}{l+1} = \frac{1+ll_2}{l_2(l+1)}$$

$$M = \frac{l_2(l+1)}{1+ll_2} = \frac{2.2 \times 2.18}{1+1.18 \times 2.2} = 1.13$$

Sixth stage (H-2):
In this stage, $S_1=0$, $S_2=1$, and $S_2'=1$.

$$C' = \frac{\frac{l_1+1}{l_1+l_2}+l}{l+1} = \frac{l_1+1+l(l_1+l_2)}{(l_1+l_2)(l+1)}$$

$$M = \frac{(l_1+l_2)(l+1)}{l_1+1+l(l_1+l_2)} = \frac{4.8 \times 2.18}{3.6+1.18 \times 4.8} = 1.13$$

Seventh stage (H-3):
In this stage, $S_2=1$, $C=1$, and $S_2'=1$.
$C'=1$
$M=1$

Eighth stage (H-4):
In this stage, $S_1=0$, $C=1$, and $S_2'=1$.

$$C' = \frac{\frac{l_1+1}{l_1}+l}{l+1} = \frac{l_1+1+ll_1}{l_1(l+1)}$$

$$M = \frac{l_1(l+1)}{l_1+1+ll_1} = \frac{2.6 \times 2.18}{3.6+1.18 \times 2.6} = 0.85$$

Rearward stage:
In this stage, $S_1=1$, $C=0$, and $S_2'=0$.
$C'=(1/l_1) \times (1/l+1)$
$M=-l_1(l+1)=-2.6 \times 2.18=5.66$ The one-way clutch 19 supported by the case 20 of the speed change gear of FIG. 7 is utilized to absorb the mechanical shock caused when the speed reduction ratio is changed from the first to the second stage and from the fifth to the sixth stage, respectively. If it is necessary to actuate the so-called engine brake with the speed change device at the first or fifth stage, the brake 95 is also actuated to hold the carrier 75 stationary through the drum 101.

Figure 9:
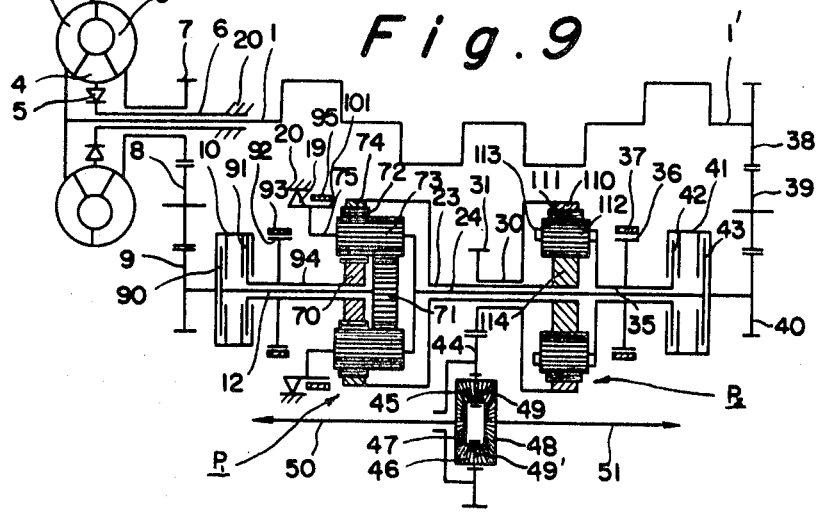
FIG. 9 is a skeleton diagram of a modification of the first embodiment, in which the second sun gear of a second Ravigneaux-type planetary gear assembly is removed, as shown in FIG. 10.
Figure 10:
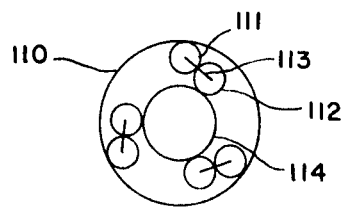

FIG 9 shows a further modification of the speed change device of FIG. 7, in which the arrangement of the various brakes and clutches is not changed but the construction of the second planetary gear assembly $P_2$ is modified. As shown in FIG. 10, the second planetary gear assembly $P_2$ of this modification comprises a sun gear 114 connected to the ring gear 74 of a first planetary gear assembly $P_1$ through a hollow shaft 23, first planet gears 112 meshed with the sun gear 114, second planet gears 111 meshed with the first planet gears 112, a ring gear 110 meshed with the second planet gears 111 and connected to an output pinion 31 through a hollow shaft 30, and a carrier 113 connected to a hollow shaft 35.

Let it be assumed that each rotary element of the first planetary gear assembly $P_1$ is represented by the same symbols as those for the corresponding rotary elements of the device of FIG. 4. In the second planetary gear assembly $P_2$, the following symbols are assumed.

$R'$: Revolving speed of the ring gear 110
$S'$: Revolving speed of the sun gear 114
$C'$: Revolving speed of the carrier 113

$$l_{50}' = \frac{\text{Pitch circle radius of the ring gear 110}}{\text{Pitch circle radius of the sun gear 114}}$$

Then, there are the following relations among the revolving speeds of the rotary elements of the device of FIG. 9.

$(l_1+1)C = l_1R+S_1$ (1)
$(l_2-1)C = l_2R-S_2$ (2)
$(l_{50}'-1)C' = l_{50}'R'-S'$ (14)
$S'=R$ (12)'
$M=1/R'$ (11)'

The operative conditions of various clutches and brakes for each operative stage are shown in Table 8. If the revolving speed of those elements which rotate at the same speed with the crankshaft 1 is represented by "1," and that of those elements which are held stationary by the brake is represented by "0," then the specific revolving speeds of various rotary elements of the speed change device of FIG. 9 in each operative stage can be summarized as shown in Table 7.

TABLE 7

| | Revolving speed | | | | | | |
|---|---|---|---|---|---|---|---|
| | First planetary gear assembly $P_1$ | | | | Second planetary gear assembly $P_2$ | | |
| Operative stage | First sun gear 71 ($S_1$) | Second sun gear 71 ($S_2$) | Carrier 75 (C) | Ring gear 74 (R) | Sun gear 114 (S') | Carrier 113 (C') | Ring gear 110 (R') |
| L-1 | | 1 | 0 | R=S' | | 0 | |
| L-2 | 0 | 1 | | R=S' | | 0 | |
| L-3 | | 1 | 1 | R=S' | | 0 | |
| L-4 | 0 | | 1 | R=S' | | 0 | |
| H-1 | | 1 | 0 | R=S' | | 1 | |
| H-2 | 0 | 1 | | R=S' | | 1 | |
| H-3 | | 1 | 1 | R=S' | | 1 | |
| H-4 | 0 | | 1 | R=S' | | 1 | |
| Rearward | 1 | | 0 | R=S' | | 0 | |

TABLE 8

| Operative stage | Brake 93 | Clutch 10, 90 | One-way clutch 19 | Clutch 41, 43 | Brake 37 | Clutch 41, 42 | Clutch 10, 91 | Brake 95 | Formula | Speed reduction ratio Numeric example $l_1=2.6$, $l_2=2.2$, $l_{50}'=2.2$ |
|---|---|---|---|---|---|---|---|---|---|---|
| L-1 | | Engaged | Actuated | | Actuated | | | Actuated | $l_{50}'l_2$ | 4.48 |
| L-2 | Actuated | do | | | do | | | | $l_{50}'(l_1+l_2)/(l_1+1)$ | 2.94 |
| L-3 | | do | | Engaged | do | | | | $l_{50}'$ | 2.2 |
| L-4 | Actuated | | | do | do | | | | $l_{50}'l_1/(l_1+1)$ | 1.59 |
| H-1 | | Engaged | Actuated | | | Engaged | | Actuated | $l_{50}'l_2/\{1+l_2(l_{50}'-1)\}$ | 1.33 |
| H-2 | Actuated | do | | | | do | | | $\dfrac{l_{50}'(l_1+l_2)}{l_1+1+(l_1+l_2)(l_{50}'-1)}$ | 1.13 |
| H-3 | | do | | Engaged | | do | | | 1 | 1.00 |
| H-4 | Actuated | | | do | | do | | | $l_{50}'l_1/(l_{50}'l_1+1)$ | 0.85 |
| Rearward | | | | | Actuated | | Actuated | Actuated | $-l_{50}'l_1$ | -5.72 |

As a numerical example, speed reduction ratios in each operative stage of the speed change device of FIG. 9 are calculated by assuming $l_1=2.6$, $l_2=2.2$, and $l_{50}'=2.2$, and the results are shown in Table 8.

Formulas to represent the speed reduction ratios in each operative stage will now be derived.

First stage (L-1):
In this stage, $S_2=1$, $C=0$, and $C'=0$.
$R'=1/l_{50}'l_2$
$M=l_{50}'l_2=2.2\times2.2=4.84$ Second stage (L-2):
In this stage, $S_1=0$, $S_2=1$, and $C'=0$.
$$R'=\frac{l_1+1}{l_{50}'(l_1+l_2)}$$
$$M=\frac{l_{50}'(l_1+l_2)}{l_1+1}=\frac{2.2\times4.8}{3.6}=2.94$$

Third stage (L-3):
In this stage, $S_2=1$, $C=1$, and $C'=0$.
$R'(1/l_{50}')$
$M=l_{50}'=2.2$ Fourth stage (L-4):
In this stage, $S_1=0$, $C=1$, and $C'=0$.
$R'=(l_1+1/l_{50}'l_1)$
$$M=\frac{l_{50}'l_1}{l_1+1}=\frac{2.2\times2.6}{3.6}=1.59$$

Fifth stage (H-1):
In this stage, $S_2=1$, $C=0$, and $C'=1$.
$$R'=\frac{\frac{1}{l_2}+l_{50}'-1}{l_{50}'}=\frac{1+l_2(l_{50}'-1)}{l_{50}'l_2}$$
$$M=\frac{l_{50}'l_2}{1+l_2(l_{50}'-1)}=\frac{2.2\times2.2}{1+2.2\times1.2}=1.33$$

Sixth stage (H-2):
In this stage, $S_1=0$, $S_2=1$, and $C'=1$.
$$R'=\frac{\frac{l_1+1}{l_1+l_2}+l_{50}'-1}{l_{50}'}=\frac{l_1+1+(l_1+l_2)(l_{50}'-1)}{l_{50}'(l_1+l_2)}$$
$$M=\frac{l_{50}'(l_1+l_2)}{l_1+1+(l_1+l_2)(l_{50}'-1)}=\frac{2.2\times4.8}{3.6+4.8\times1.2}=1.13$$

Seventh stage (H-3):
In this stage, $S_2=1$, $C=1$, and $C'=1$.
$R'=1$
$M=1$

Eighth stage (H-4):
In this stage, $S_1=0$, $C=1$, and $C'=1$.
$$R'=\frac{\frac{l_1+1}{l}+l_{50}'-1}{l_{50}'}=\frac{l_1+1+l_1(l_{50}'-1)}{l_{50}'l_1}=\frac{l_{50}'l_1+1}{l_{50}'l_1}$$
$$M=\frac{l_{50}'l_1}{l_{50}'l_1+1}=\frac{2.2\times2.6}{2.2\times2.6+1}=0.85$$

Rearward stage:
In this stage, $S_1=1$, $C=0$, and $C'=0$.
$R'=(1/l_{50}'l_1)$
$M=-l_{50}'l_1=-2.2\times2.6=-5.72$ The first embodiment as shown in FIG. 1 and the succeeding modifications thereof described hereinbefore utilize split torque transmission routes, i.e. a route connected to an end of the engine crankshaft 1 through a torque converter to deliver power through a series of gear train and another route connected to the opposite end 1' of the engine crankshaft to deliver power through another gear train. The powers transmitted through the two split routes are combined together at the second planetary gear assembly $P_2$ to give output power through an output pinion 31. One of the two transmission routes is connected nonhydraulically to the engine crankshaft through clutch plates 42 and 43 without using any torque converter. If the switching operation of the clutch is made quickly, there can be produced a mechanical shock due to such switching.

Figure 11:
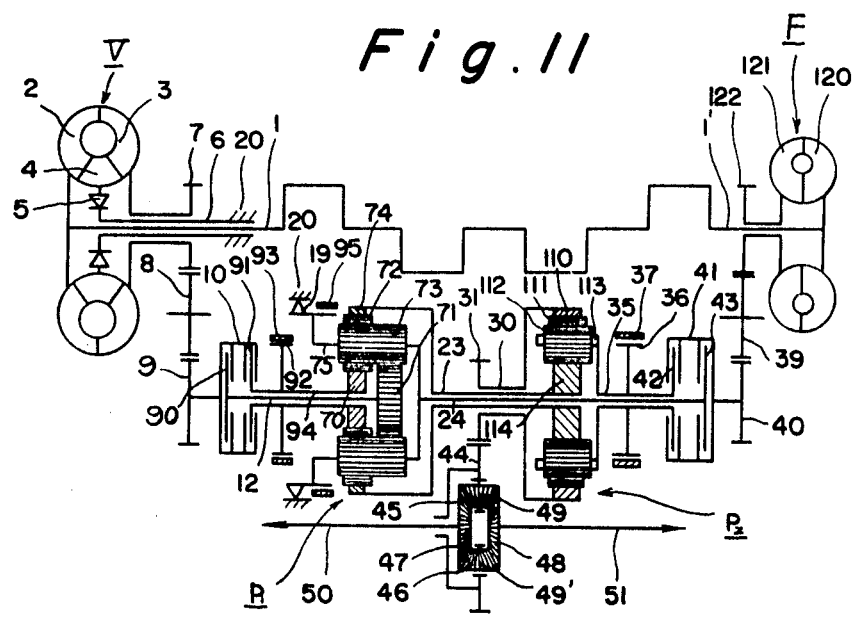
FIG. 11 is a skeleton diagram of another modification of the first embodiment of the present invention, which includes a fluid coupling to connect one end of the crankshaft of an engine to a second Ravigneaux-type planetary gear assembly.

According to the present invention, it is possible to use a fluid coupling F in order to eliminate such mechanical shock. FIG. 11 shows an example of such speed change gears using a fluid coupling F for the purpose, in which the arrangement of the rotary elements are the same as that of the device of FIG. 9. The fluid coupling F comprises a pump 120 connected to the opposite end 1' of the engine crankshaft 1, and turbine 121. A transmission gear 122 meshes with an intermediate transmission gear 39, which in turn transmits power to a last transmission gear 40 secured to a clutch body 41. The power from the opposite end 1' of the engine crankshaft 1 is transmitted to the planetary gear assemblies through clutches 41, 42 and 41, 43. In the example of FIG. 11, the fluid coupling F is connected to the opposite end of the engine crankshaft, but it can be located at any other suitable positions, such as an intermediate point between the transmission gear 40 and the clutch body 41.

Figure 12:
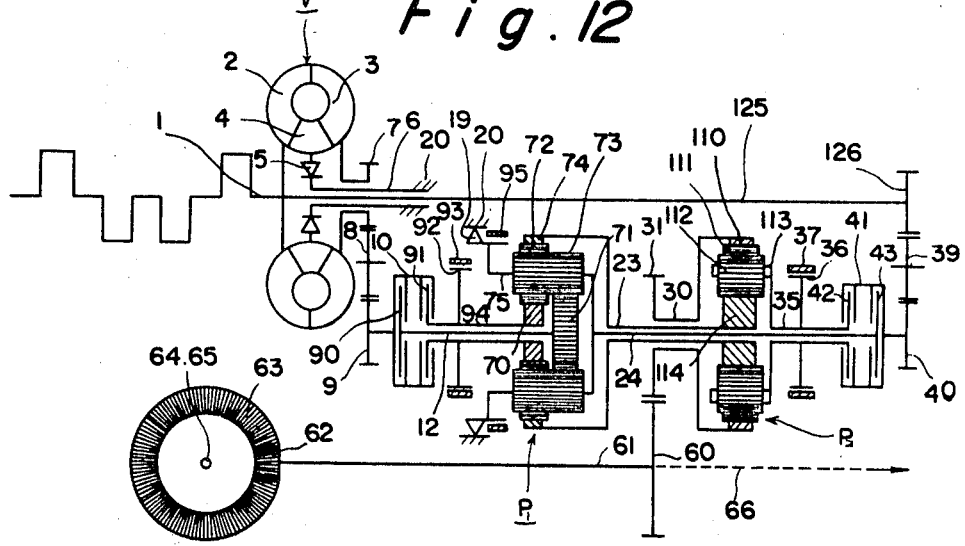
FIG. 12 is a skeleton diagram of another modification of the first embodiment, which uses a transmission shaft connected to the pump of a torque converter and penetrating through the torque converter so as to deliver the power on the crankshaft to planetary gear assemblies.

FIG. 12 illustrates a modification of the speed change device of FIG. 9, in which the arrangement of various rotary elements is not changed, but the input power to the planetary gear assemblies of the device is taken only from one end of the engine crankshaft 1. This modification is particularly suitable for a vehicle having its engine mounted longitudinally. In the figure, the engine output is transmitted from one end of the crankshaft to the planetary gear assemblies through a torque converter V connected to a series of gear train 7 to 9, and at the same time the power is transmitted from the same end of the crankshaft to a transmission shaft 125 extending through a stator axis 6 of the torque converter V. Thus, the power is also delivered to a transmission gear 126 mounted on the transmission shaft 125, and further to gears 39 and 40 connected with clutches 41, 42 and 41, 43. Accordingly, the engine output power is transmitted to the planetary gear assemblies through the two split routes.

Figure 13:
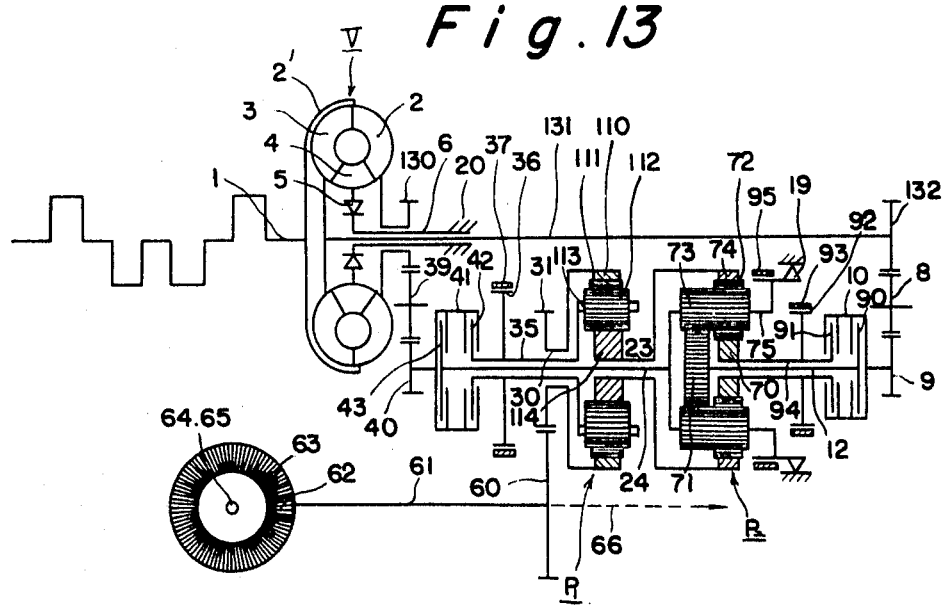
FIG. 13 is a skeleton diagram of a modification of the speed change gear of FIG. 12, in which the arrangement of various elements of the speed change gear is reversed.

With the gear arrangement of FIG. 12, it is possible to invert the direction in which the input power is transmitted to the planetary gear assemblies, as shown in FIG. 13. In the figure, the structure of a torque converter V is different from that of the preceding example, and a turbine 3 of the torque converter V is housed in a pump case 2' connecting engine crankshaft 1 to pump 2. Engine power to be transmitted nonhydraulically to planetary gear assemblies is delivered through a route including a series of transmission gears 130, 39, and 40 and clutches 41, 42 and 41, 43 located to the left of planetary gear assemblies. The gear 130 is secured to the pump 2. On the other hand, engine power to be transmitted hydraulically through the torque converter is delivered to the turbine 3 and further to a transmission shaft 131 extending through the axial centerline of the stator shaft 6. A transmission gear 132 mounted on the shaft 131 delivers the power through gears 8 and 9 to a clutch body 10 located at the opposite end of the planetary gear assemblies. The planetary gear assemblies carry out the speed reduction in the same manner as described hereinbefore referring to FIG. 9.

Figure 14:
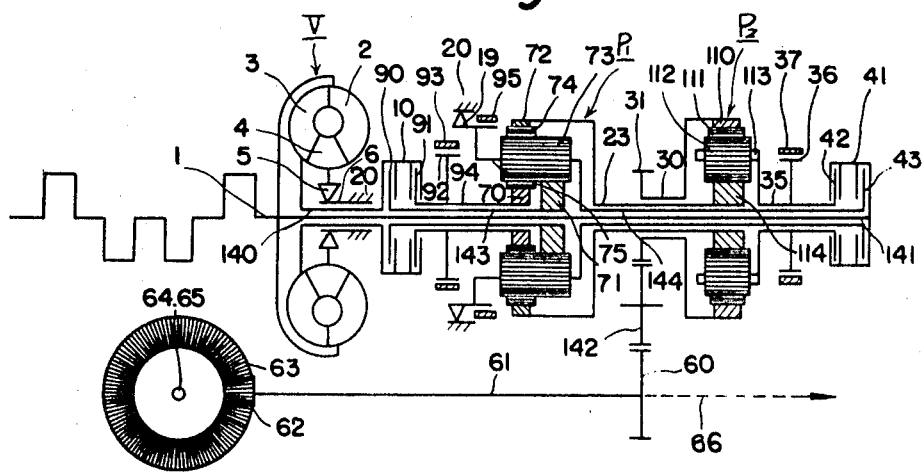
FIG. 14 is a skeleton diagram of another modification of the speed change gear of FIG. 12, in which transmission shaft extends through the axial centerline of planetary gear assemblies.

The transmission shaft extending through the stator shaft 6 of a torque converter V can be also disposed along the axial centerline of planetary gear assemblies, by aligning the centerline of the planetary gear assemblies with the axial centerline of engine crankshaft 1, as shown in FIG. 14. In the figure, a hollow turbine shaft 140 is connected to a clutch body 10 to transmit the power on the turbine 3 of the torque converter. A transmission shaft 141 extends through the axial centerlines of the turbine shaft 140 and the planetary gear assemblies $P_1$ and $P_2$. The opposite end of the transmission shaft 141 is connected to a clutch body 41. An intermediate spur gear 142 transmits the output power on the output pinion 31' to a spur gear 60. An intermediate shaft 143 connecting a clutch plate 90 to the second sun gear 71 of a first planetary gear assembly $P_1$ corresponds to the transmission shaft 12 of FIG. 9, while another intermediate shaft 144 connecting the carrier 75 of the first planetary gear assembly $P_1$ to the clutch plate 43 corresponds to the transmission shaft 24 of FIG 9 The operation of the speed change gear of FIG 14 is the same as that of FIG 9.

Figure 15:
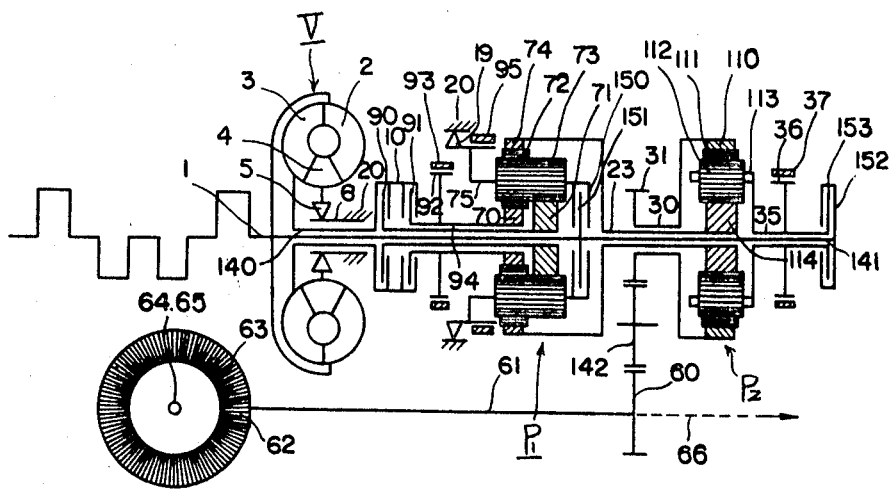
FIG. 15 is a skeleton diagram of a modification of the speed change gear of FIG. 14, in which a triple shaft is used instead of a quadruple shaft of the device of FIG. 14.

The quadruple or four layer shaft portion between the planetary gear assemblies $P_1$ and $P_2$ in the device of FIG. 14, i.e. the connecting portion including solid transmission shaft 141, and hollow shaft 144, 23, 30, can be simplified to a triple or three layer shaft by dividing the clutches 41, 42, and 41, 43, as shown in FIG. 15. In a modification of FIG. 15, a clutch 150, 151 and another clutch 152, 153 corresponds to the clutch 41, 43 and the clutch 41, 42 of FIG. 14, respectively. The power on a solid transmission shaft 141 is selectively delivered to a carrier 75 through the clutch 150, 151. Similarly, the transmission shaft 141 is selectively connected to a carrier 113 through clutch 152, 153. The operation of the modification of FIG 15 can be understood from Table 8, by substituting the clutches 150, 151 and 152, 153 for the clutches 41, 43 and 41, 42, respectively.

Figure 16:
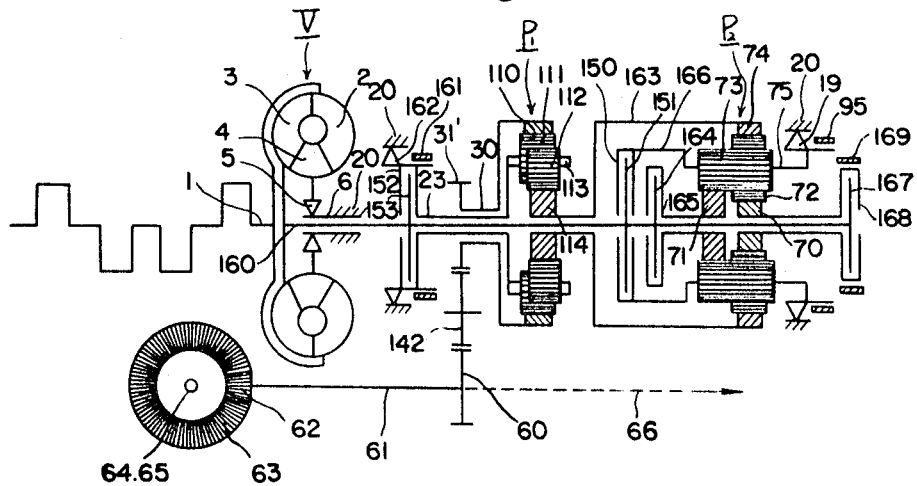
FIG. 16 is a skeleton diagram of a modification of the speed change gear of FIG. 12, which uses a transmission shaft connected to the turbine of a torque converter.

In order to eliminate completely the mechanical shock which follows each shift of operative stages of the speed change gear, the two transmission routes between the engine output and the gear trains can be connected to the turbine of a torque converter V, as shown in FIG. 16. In this modification, a transmission shaft 160 is connected to the turbine 3 of the torque converter V, and four clutch plates 153, 151, 164, and 167 are secured to the shaft 160. A brake 161 acts to stop a carrier 113 during rearward stage and when engine brake is applied. A one-way clutch 162 acts to stop the carrier 113 when the device is run at a low speed. The sun gear 114 of a second planetary gear assembly $P_2$ is connected to the ring gear 74 of a first planetary gear assembly $P_1$ through a link member 163.

A clutch body 165 is selectively engageable with the clutch plate 164 to transmit power to a second sun gear 71 of the first planetary gear assembly $P_1$. A clutch body 150 of this modification is connected to a carrier 75 of the first planetary gear assembly $P_1$ through another link member 166. A clutch body 168 transmits power to a first sun gear 70 when it is engaged with the clutch plate 167, while another brake 169 is engageable with the clutch body 168 to stop it. There are the following correspondence between clutches and brakes of FIG. 16 and those of FIG. 14.

|  | In FIG. 16 | In FIG. 14 |
| --- | --- | --- |
| Clutch | 168, 167 | 10,91 |
|  | 165,164 | 10,90 |
|  | 150,151 | 41,43 |
|  | 152,153 | 41,42 |
| Brake | 169 | 937 |

Accordingly, the operation of the device of FIG. 16 can be understood from Table 8 by making the substitution corresponding to the above table, e.g. substitution of clutch 168, 167 for clutch 10, 91, etc.

The one-way clutch 162 is provided for prevention of reverse rotation of the carrier 113 in the first to fourth stages of operation. During normal operation, the carrier 113 cannot revolve in the reverse direction, or in a direction opposite to the rotation of the crankshaft 1, because the one-way clutch 162 does not allow the reverse rotation of the carrier 113. However, when the vehicle proceeds along a downward slope and engine brake is applied, the carrier 113 tends to rotate in the normal direction, or in the direction of crankshaft rotation, even though the carrier 113 should be held stationary in the first stage. Therefore, the brake 161 is necessary to hold the carrier 113 stationary under such conditions. The above combination of the one-way clutch and the brake engageable on the carrier of the second planetary gear assembly can be used in any of the preceding embodiment and modifications thereof, if it is necessary to do so.

Figure 17:
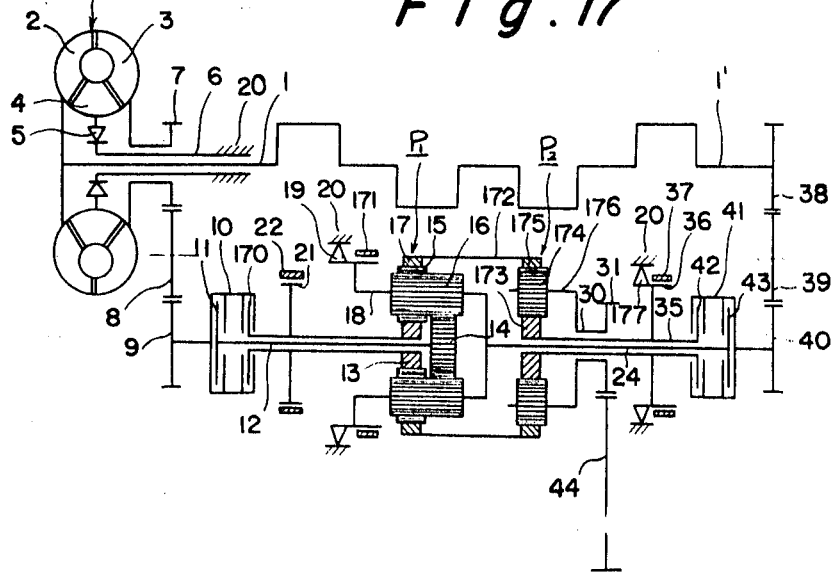
FIG. 17 is a skeleton diagram of a second embodiment of the present invention, which utilizes a Ravigneaux-type planetary gear assembly in conjunction with a known simple planetary gear assembly.

In the preceding embodiment and modifications, two Ravigneaux-type planetary gear assemblies are used, but it is possible to replace one of the Ravigneaux-type planetary gear assemblies with a simple planetary gear assembly. FIG. 17 shows a second embodiment, which uses a Ravigneaux-type planetary gear assembly $P_1$ and a simple planetary gear assembly $P_2$. In the figure, the same parts or elements as those of the first embodiment described hereinbefore, referring to FIG. 1 are designated by the same symbols and numerals, and only those parts which are different from the first embodiment will be described hereinafter.

Figure 18:
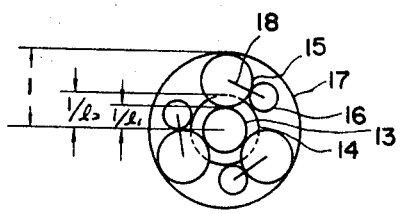
FIGS. 18 and 19 are diagrammatic illustrations of planetary gear assemblies usable in the second embodiment, respectively showing a Ravigneaux-type and a simple planetary gear assembly.

The power on the engine crankshaft 1 is transmitted to a clutch body 10 through a torque converter V and a series of transmission gears 7, 8, 9, and the clutch body 10 is engageable with the clutch plates 11 and 170 connected to a first sun gear 13. A brake 171 is provided so as to stop a carrier 18 of the first planetary gear assembly $P_1$, which is of Ravigneaux type, as shown in FIG. 18.

Figure 19:
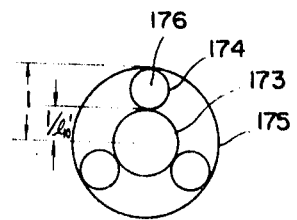

The second planetary gear assembly $P_2$ of this embodiment is of simple type, as shown in FIG. 19, and comprises a first sun gear 173 connected to a clutch plate 42 through a hollow transmission shaft 35, planet gears 174 engaged with said sun gear 173, a ring gear 175 meshed with said planet gears 174, and a carrier 176 carrying said planet gears 174 in a rotatable manner. A link member 172 connects the ring gear 17 of the first planetary gear assembly $P_1$ to the ring gear 175 of the second planetary gear assembly $P_2$. An output pinion 31 is connected to the carrier 176 through a hollow shaft 30.

Prior to proceeding to derivation of formulas representing speed reduction ratios in each operative stage of the second embodiment, let it be assumed that each rotary element of the first planetary gear assembly $P_1$ of this embodiment is represented by the same symbols as those for the corresponding rotary element of the modified first embodiment, as described hereinbefore referring to FIG. 4. In the second planetary gear assembly $P_2$, the following symbols are assumed.

$R_{10}'$: Revolving speed of the ring gear 175
$S_{10}'$: Revolving speed of the sun gear 173
$C_{10}'$: Revolving speed of the carrier 176

$$l_{10}' = \frac{\text{Pitch circle radius of the ring gear 175}}{\text{Pitch circle radius of the sun gear 173}}$$

Then, there are the following relations among the revolving speeds of the rotary elements of the device of FIG. 17.

$(l_1+1)C = l_1R + S_1$ (1)
$(l_2-1)C = l_2R - S_2$ (2)
$(l_{10}'+1)C_{10}' = l_{10}'R_{10}' + S_{10}'$ (20)
$R_{10}' = R$ (21)

$$M = 1/C_{10}' = \frac{l_{10}'+1}{l_{10}'R_{10}' + S_{10}'} \quad (22)$$

From the formulas (1), (2), (20), (21), and (22), the formula for the speed reduction ratio can be rewritten as follows.

$$M = \frac{l_{10}'+1}{\frac{l_{10}'(l_1+1)}{l_1}C - \frac{l_{10}'}{l_1}S_1 + S_{10}'} \quad (23)$$

$$= \frac{l_{10}'+1}{\frac{l_{10}'(l_2-1)}{l_2}C + \frac{l_{10}'}{l_2}S_2 + S_{10}'} \quad (24)$$

$$= \frac{l_{10}'+1}{\frac{l_{10}'(l_2-1)}{l_1+l_2}S_1 + \frac{l_{10}'(l_1+1)}{l_1+l_2}S_2 + S_{10}'} \quad (25)$$

The operative conditions of various clutches and brakes for each operative stage are shown in Table 10. If the revolving speed of those elements which rotate at the same speed with the crankshaft 1 is represented by "1," and that of those elements which are held stationary by the brake is represented by "0," then the specific revolving speeds of various rotary elements of the speed change device in each operative stage can be summarized as shown in Table 9.

TABLE 9

| | Revolving speed | | | | | | |
|---|---|---|---|---|---|---|---|
| | First planetary gear assembly $P_1$ | | | | Second planetary gear assembly $P_2$ | | |
| Operative stage | First sun gear 13 ($S_1$) | Second sun gear 14 ($S_2$) | Carrier 18 (C) | Ring gear 17 (R) | Ring gear 175 ($R_{10}'$) | Sun gear 173 ($S_{10}'$) | Carrier 32 ($C_{10}'$) |
| L-1 | | 1 | 0 | $R=R_{10}'$ | | 0 | |
| L-2 | 0 | 1 | | | $R=R_{10}'$ | 0 | |
| L-3 | | 1 | 1 | | $R=R_{10}'$ | 0 | |
| L-4 | 0 | | 1 | | $R=R_{10}'$ | 0 | |
| H-1 | | 1 | 0 | | $R=R_{10}'$ | 1 | |
| H-2 | 0 | 1 | | | $R=R_{10}'$ | 1 | |
| H-3 | | 1 | 1 | | $R=R_{10}'$ | 1 | |
| H-4 | 0 | | 1 | | $R=R_{10}'$ | 1 | |
| Rearward | 1 | | 0 | | $R=R_{10}'$ | 0 | |

As a numerical example, speed reduction ratios in each operative stage of the second embodiment, as shown in FIG. 17, are calculated by assuming $l_1=2.6$, $l_2=2.2$, and $l_{10}'=2.0$, and the results are shown in Table 10.

Formulas to represent the speed reduction ratios in each operative stage will now be derived.

First stage (L-1):
In this stage, $S_2=1$, $C=0$, and $S_{10}'=0$.
From the formula (24), $$M = \frac{(l_{10}'+1)l_2}{l_{10}'} = \frac{3.0 \times 2.2}{2.0} = 3.30$$

Second stage (L-2):
In this stage, $S_1=C$, $S_2=1$, and $S_{10}'=0$.
From the formula (25), $$M = \frac{(l_{10}'+1)(l_1+l_2)}{l_{10}'(l_1+1)} = \frac{3.0 \times 4.8}{2.0 \times 3.6} = 2.00$$

Third stage (L-3):
In this stage, $S_2=1$, $C=1$, and $S_{10}'=0$.
From the formula (24), $$M = \frac{l_{10}'+1}{l_{10}'} = \frac{3.0}{2.0} = 1.5$$

Fourth stage (L-4):
In this stage, $S_1=0$, $C=1$, and $S_{10}'=0$.
From the formula (23), $$M = \frac{(l_{10}'+1)l_1}{l_{10}'(l_1+1)} = \frac{3 \times 2.6}{2 \times 3.6} = 1.08$$

Fifth stage (H-1):
In this stage, $S_2=1$, $C=0$, and $S_{10}'=1$.
From the formula (24), $$M = \frac{(l_{10}'+1)l_2}{l_{10}'+l_2} = \frac{3 \times 2.2}{2+2.2} = 1.57$$

Sixth stage (H-2):
In this stage, $S_1=0$, $S_2=1$, and $S_{10}'=1$.
From the formula (25), $$M = \frac{(l_{10}'+1)(l_1+l_2)}{l_{10}'(l_1+1)+l_1+l_2} = \frac{3 \times 4.8}{2 \times 3.6 + 4.8} = 1.20$$

Seventh stage (H-3):
In this stage, $S_2=1$, $C=1$, and $S_{10}'=1$.
From the formula (24),
$M=1$ Eighth stage (H-4):
In this stage, $S_1=0$, $C=1$, and $S_{10}'=1$.
From the formula (23), $$M = \frac{(l_{10}'+1)l_1}{l_{10}'(l_1+1)+l_1} = \frac{3.0 \times 2.6}{2.0 \times 3.6 + 2.6} = 0.80$$

Rearward stage:
In this stage, $S_1=1$, $C=0$, and $S_{10}'=0$.
From the formula (23), $$M = \frac{-(l_{10}'+1)l_1}{l_{10}'} = \frac{3.0 \times 2.6}{2.0} = -3.90$$

In this embodiment, the brakes 171 and 37 are actuated during the rearward stage operation and when engine brake is applied. For instance, during normal operation in the L-1 stage, the friction between the wheel tire and the road surface tends to rotate the carrier 18 and the sun gear 173 in the reverse direction. However, the one-way clutches 19 and 177 prevent such reverse rotation, because such one-way clutches allow normal rotation only and not the reverse rotation. On the other hand, when the vehicle proceeds along a downward

TABLE 10

| Operative stage | Clutch 10, 170 | Brake 22 | Clutch 10, 11 | One-way clutch 19 | Clutch 41, 43 | Brake 37 | Clutch 41, 42 | Brake 171 | One-way clutch 177 | Formula | Speed reduction ratio Numeric example $l_1=2.6$ $l_2=2.2$ $l_{10}=2.0$ |
|---|---|---|---|---|---|---|---|---|---|---|---|
| L-1 | | | Engaged | Actuated | | Actuated | | Actuated | Actuated | $(l_{10}'+1)l_2l_{10}'$ | 3.30 |
| L-2 | | Actuated | do | | | do | | | do | $(l_{10}'+1)(l_1+l_2)/l_{10}'(l_1+1)$ | 2.00 |
| L-3 | | | do | | Engaged | do | | | do | $(l_{10}'+1)/l_{10}'$ | 1.50 |
| L-4 | | Actuated | | do | | do | | | do | $(l_{10}'+1)l_1/(l_1+1)l_{10}'$ | 1.08 |
| H-1 | | | Engaged | Actuated | | | Engaged | Actuated | | $(l_{10}'+1)l_2/(l_{10}'+l_2)$ | 2.57 |
| H-2 | | Actuated | do | | | | do | | | $\dfrac{(l_{10}'+1)(l_1+l_2)}{l_{10}'(l_1+1)+l_1+l_2}$ | 1.20 |
| H-3 | | | do | | Engaged | | do | | | | 1.00 |
| H-4 | | do | | do | | | do | | | $\dfrac{(l_{10}'+1)l_1}{l_{10}'(l_1+1)+l_1}$ | 0.80 |
| Rearward | Engaged | | | | | Actuated | | Actuated | | $-\dfrac{(l_{10}'+1)l_1}{l_{10}'}$ | -3.90 | slope and engine brake is applied, the carrier 18 and the sun gear 173 tends to rotate in the normal direction, even though both the carrier 18 and the sun gear 173 should be held stationary in the first stage. Therefore, the brakes 171 and 37 are necessary to hold the carrier 18 and the sun gear 173 stationary under such conditions.

The second embodiment as shown in FIG. 17 is suitable for mounting on a vehicle having an engine disposed longitudinally. However, it is apparent for those skilled in the art that the device of FIG. 17 can be easily modified to suit a vehicle having an engine mounted longitudinally, or at right angles to the travelling direction of the vehicle. For example, the modification on an output wheel 44 of FIG. 17 to the structure as shown in FIG. 1 will be sufficient for that purpose.

Figure 20:
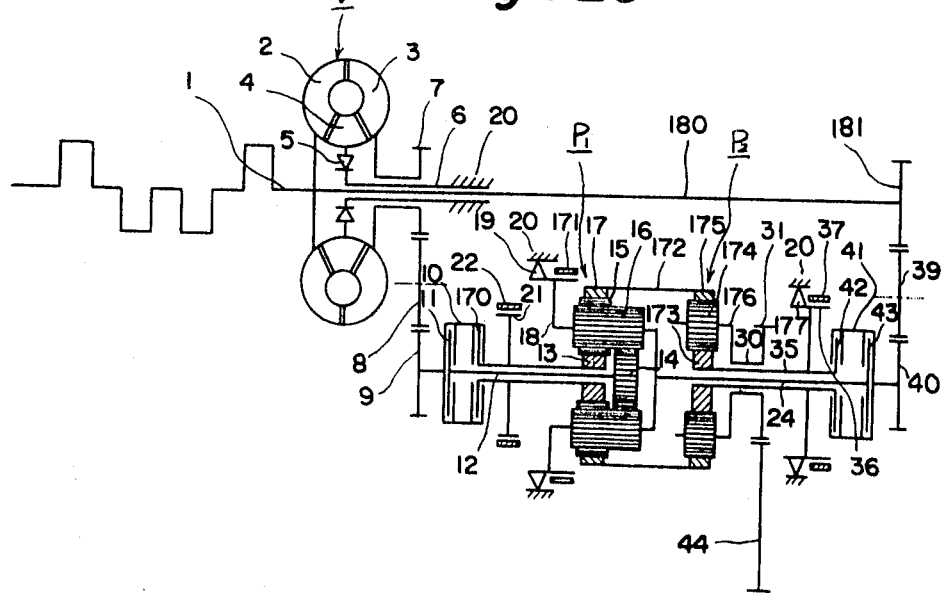
FIG. 20 is a modification of the second embodiment, which uses a transmission shaft connected the pump of a torque converter and penetrating through the axial centerline of a torque converter.

The embodiment as shown in FIG. 17 has its output pinion 31 located at about the longitudinal middle point of the engine crankshaft 1. In order to facilitate arrangement of the speed change device in alignment with the engine either in front of or on the rear end of the crankshaft, it can be modified as shown in FIG. 20. In this modification, a torque converter V mounted at one end of the engine crankshaft 1, and the output power from the turbine 3 of the torque converter is delivered to a clutch body 10 through a gear train 7, 8, and 9, and then transferred to a first planetary gear assembly $P_1$. At the same time, the engine output power is delivered to a transmission shaft 180 extending through the axial centerline of the torque converter V, and a transmission gear 181 secured to the opposite end of the shaft 180 acts to transmit the power to a clutch body 41 through the gear trains 39, and 40, and further to a sun gear 173 or a carrier 18. The mechanism and the function of the speed change operation with various rotary elements of this modification are the same as described hereinbefore referring to FIG. 17 and Tables 9 and 10.

Figure 21:
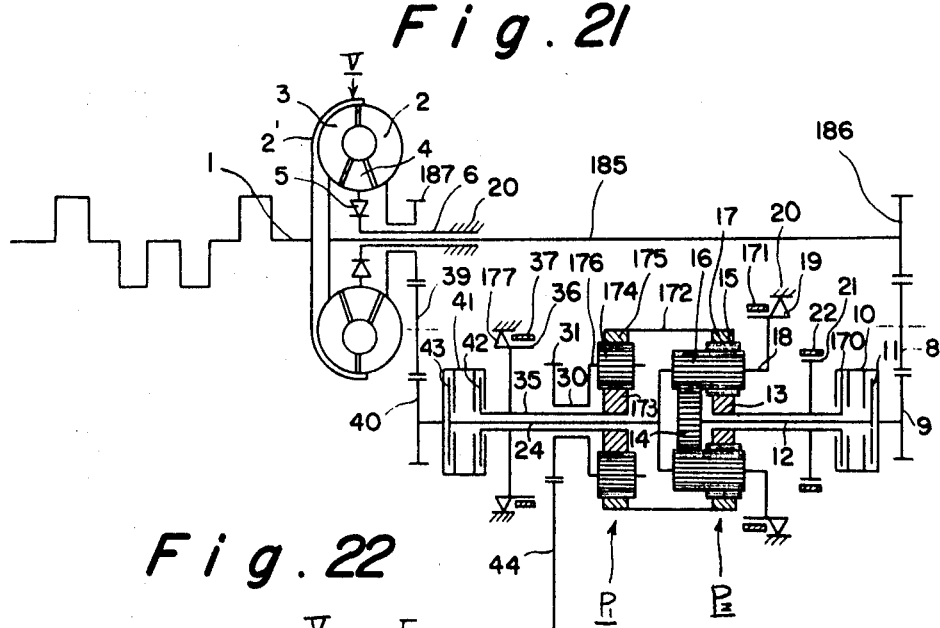
FIG. 21 is a skeleton diagram of a modification of the speed change gear of FIG. 20, which uses a transmission shaft connected to a turbine of the torque converter.

It is also possible to interchange the position of the first and second planetary gear assemblies $P_1$ and $P_2$, as shown in FIG. 21. The engine crankshaft 1 is connected to the pump case 2' of a torque converter V to transmit the power to the pump 2, and further to the second and first planetary gear assemblies $P_2$ and $P_1$ through a transmission gear train 187, 39, and 40. At the same time, the power produced on turbine 3 is delivered to a transmission shaft 185 extending through the axial centerline of the torque converter V, and a transmission gear 186 mounted at the opposite end of the transmission shaft 185 acts to deliver the power to the first planetary gear assembly $P_1$ through a gear train 8, 9 and a clutch means 10, 11, 170. The mechanism and the function of the speed change operation with the various rotary elements are the same as described hereinbefore referring to FIG. 17 and Tables 9 and 10.

Figure 22:
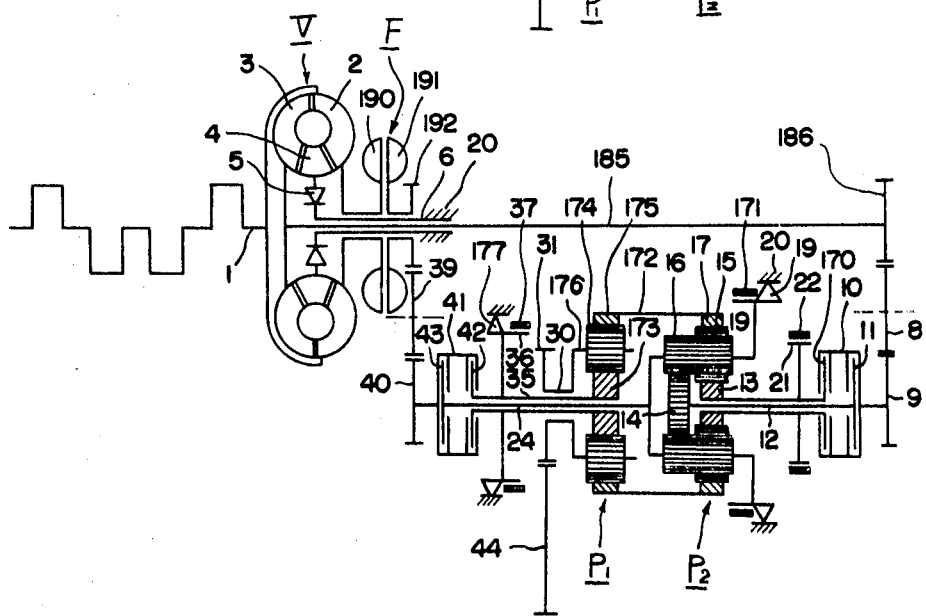
FIG. 22 is a skeleton diagram of a modification of the second embodiment, which uses a fluid coupling inserted between the pump and a transmission gear associated with a Ravigneaux-type planetary gear assembly.

FIG. 22 shows a further modification of the device of FIG. 21 to reduce the mechanical shock accompanying switch over of gears for shifting operative stage of the speed change gear by inserting a fluid coupling F between the pump 2 of a torque converter V and a transmission gear train 192, 39, and 40. The fluid coupling F comprises a pump 190 connected to the pump 2 of the torque converter V and a turbine 191 connected to the transmission gear 192. The output power of the fluid coupling turbine 191 is delivered to a clutch body 41 through the gear train 39 and 40. The remaining parts of the speed change device are the same as those of the preceding example, as shown in FIG. 21. With the fluid coupling F thus inserted, the mechanical shock, especially the shock caused when the clutch body 41 is suddenly engaged with a clutch plate 42, is absorbed by the fluid in the fluid coupling, and the shock is not felt by the operator.

Figure 23:
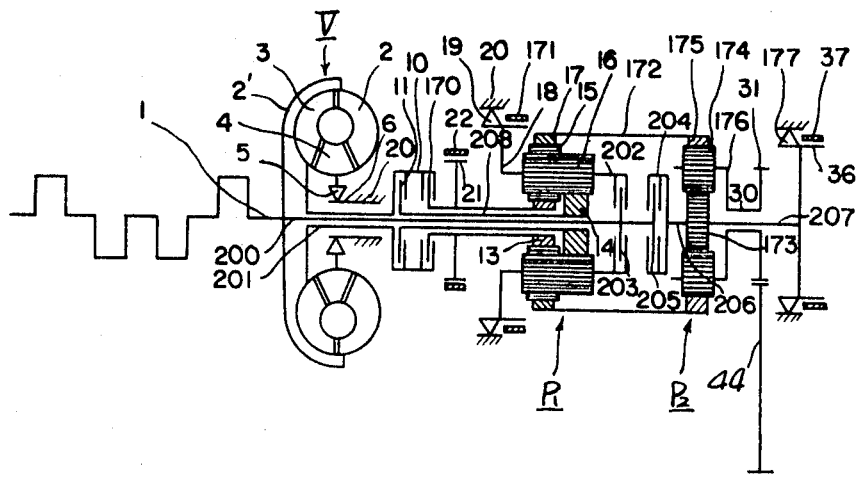
FIGS. 23 to 25 are skeleton diagrams of different modifications of the second embodiment, each using a transmission shaft extending along the axial centerline of planetary gear assemblies.

The planetary gear assemblies of the speed change device can be aligned with the axial centerline of the engine crankshaft, as shown in FIG. 23. The arrangement of various gears in the modification of FIG. 23 is the same as that of FIG. 20, but the disposition of clutches is different. The power produced on the turbine of the torque converter V is delivered to a first planetary gear assembly $P_1$ through a hollow shaft 201 and a clutch means 10, 11, 170, while a transmission shaft 200 connected to the crankshaft 1 of engine transmits the engine output power to a carrier 18 of the first planetary gear assembly $P_1$ through a clutch plate 203 and a clutch body 202. A clutch plate 205 is also mounted on the transmission shaft 200 to deliver the power to the sun gear 173 of a second planetary gear assembly $P_2$ through a clutch body 204 and a shaft 206. Another shaft 207 is connected to the sun gear 173, so that a one-way clutch 177 and a brake 37 will act on the sun gear 173 through a drum 36 secured to the shaft 207. The operation of this modification can be understood by Tables 9 and 10, with substitution of the clutches 41, 43, and 41, 42 to the corresponding clutches 202, 203 and 204, 205, respectively.

Figure 24:
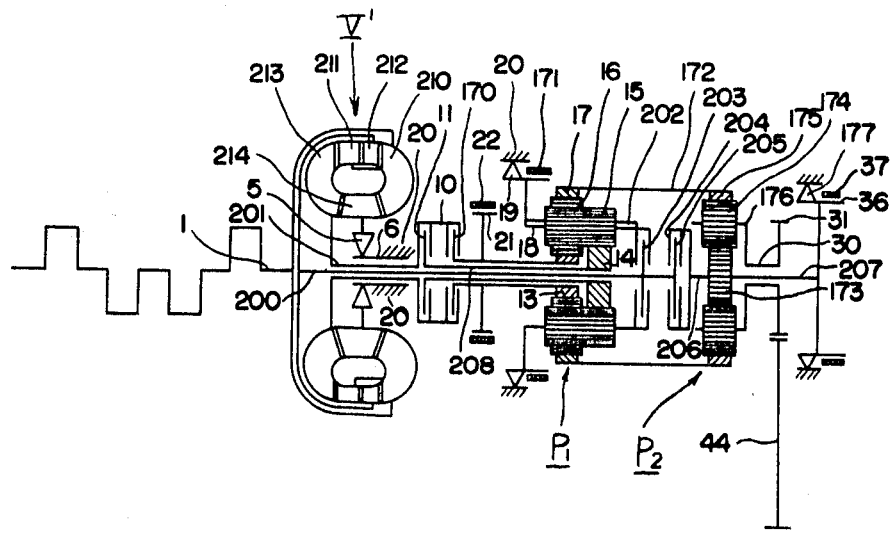

FIG. 24 shows another modification, in which a multiturbine torque converter V' is used to reduce the level of shock at the time of shifting the operative stage. The multiturbine torque converter V' comprises a first pump 210 and a second pump 211, both connected directly to an engine crankshaft 1, a first turbine 212 connected clutch plates 203 and 205 through a transmission shaft 200, a second turbine 213 connected to a clutch body 10 through a hollow shaft 201, and stator 214 connected to a one-way clutch 5 allowing normal rotation of the stator 214 but not reverse rotation thereof. The arrangement of various rotary elements of this modification is the same as that of the preceding example, as shown in FIG. 23, except that the transmission shaft 200 is directly connected to the crankshaft 1 in the preceding example, while the shaft 200 is connected to the first turbine 212 in this modification. Therefore, the mechanical shock at the time of shifting operative stages can be reduced effectively. For instance, even when the clutch 203, 202 or 204, 205 is suddenly engaged, the inertia which affects the driver is that of the first turbine 212, while in the case of the device of FIG. 23, the entire inertia of the engine crankshaft 1 directly affects the driver. The mechanism of the speed change operation of this modification is identical with that of the preceding example.

As another means for reducing the mechanical shock due to shifting the operative stage, it is possible to use a three-element torque converter to connect the transmission shaft 200 to a turbine 3 of the torque converter.

Figure 25:
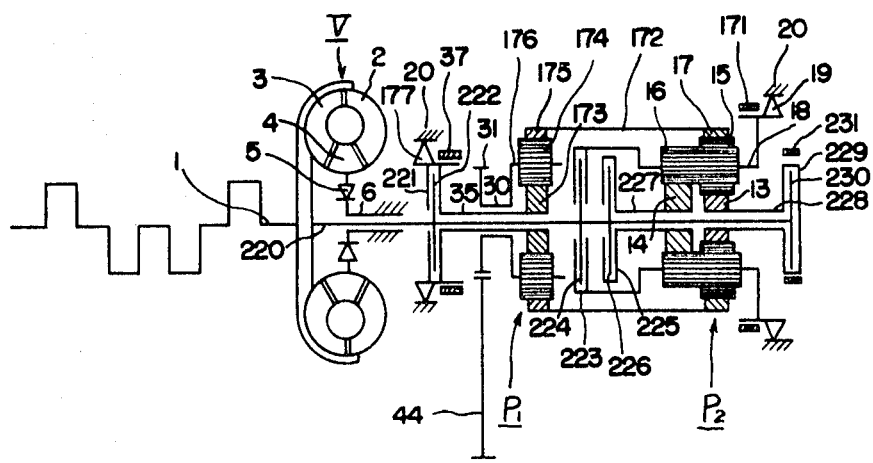

FIG. 25 shows a further modification of the device of FIG. 23 by interchanging the location of the first and second planetary gear assemblies $P_1$ and $P_2$. With such interchange, the output pinion 31 can be located close to the engine to facilitate mounting engine on a vehicle of certain special construction. This modification is also characterized in that all the power transmitted to the speed change device passes through the turbine 3 of a torque converter. In the figure, a transmission shaft 220 is connected to the turbine 3 of the torque converter V, and clutch plates 222, 224, 226, and 230 are mounted on the transmission shaft 220. A clutch body 221 is connected with the sun gear 173 of a second planetary gear assembly $P_2$ and the power on the clutch plate 222 is delivered to the sun gear 173. A clutch body 223 is engageable with the clutch plate 224 to transmit the power to the carrier 18 of a first planetary gear assembly $P_1$. A clutch body 225 is engageable with the clutch plate 226 to transmit the power to a second sun gear 14 of the first planetary gear assembly $P_1$. Another clutch body 229 is connected to a first sun gear 13 of the first planetary gear assembly $P_1$ through a hollow shaft 228 and engageable with the clutch plate 230 to transmit the power to said sun gear 13. A brake 231 is provided to selectively stop the clutch body 229. There are the following correspondence between the devices of FIGS. 17 and 25.

|  | In FIG. 25 | In FIG. 17 |
| --- | --- | --- |
| Clutches | 229,230 | 10,170 |
|  | 225,226 | 10,11 |
|  | 221,222 | 41,42 |
|  | 223, 224 | 41, 43 |
| Brake |  |  |
|  | 231 | 22 |

The operation of the speed change gear of FIG. 25 can be understood from Table 10 by making substitutions corresponding to the last-mentioned table.

In the speed change gears illustrated in FIGS. 17 to 25, if the clutch connecting the carrier 18 of the first planetary gear assembly $P_1$ to the input power means is eliminated, then such speed change gears can be operated in six forward stages and one rearward stage of speed reduction ratio. More particularly, such modification means elimination of the clutch plate 43 and the shaft 24 in the devices of FIGS. 17, 20, 21, and 22, or elimination of the clutch 202, 203 in the devices of FIGS. 23 and 24, or elimination of the clutch 223, 224 in the device of FIG. 25.

Figure 26:
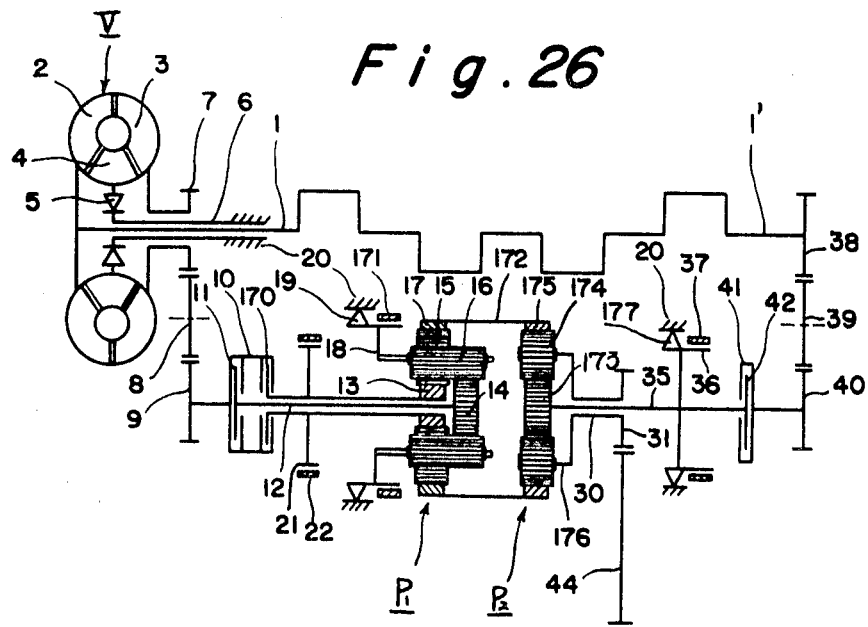
FIGS. 26 and 27 are skeleton diagrams of speed change gears producing six stages of speed reduction ratio, respectively showing modifications of the devices of FIG. 17 and FIG. 25.
Figure 27:
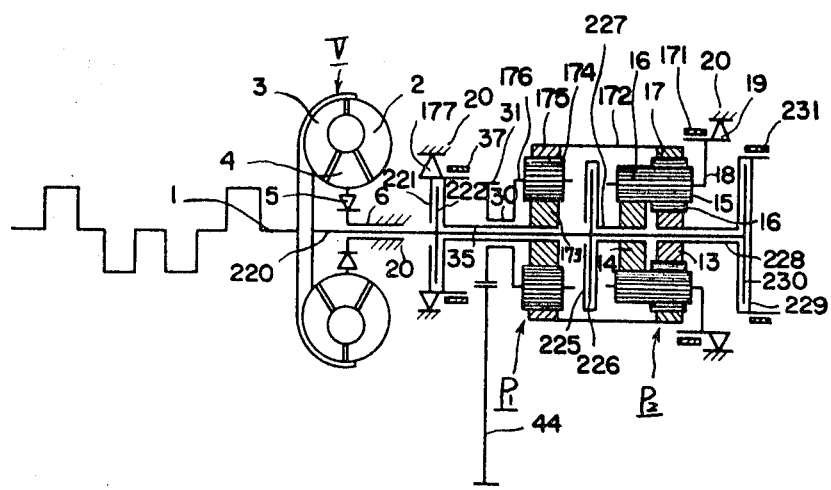

For instance, FIG. 26 illustrates a simplified speed change gear prepared by eliminating the clutch 41, 43 from the device of FIG. 17, and FIG. 27 shows a similar simplified speed change gear prepared by eliminating the clutch 223, 224 from the device of FIG. 25. The speed change gears of FIGS. 26 and 27 are very simple yet practicable. In operation, the L-4 and H-4 stages of speed reduction ratio are eliminated, and the speed change gears are operated in six forward stages and one rearward stage. The specific revolving speeds of selected rotary elements and operative conditions of various clutches and brakes in each operative stage are shown in Tables 11 and 12, which are self-explanatory from the preceding description to those skilled in the art.

TABLE 11

| Operative stage | Revolving speed | | | | | | |
|---|---|---|---|---|---|---|---|
| | First planetary gear assembly $P_1$ | | | Second planetary gear assembly $P_2$ | | | |
| | First sun gear 13 ($S_1$) | Second sun gear 14 ($S_2$) | Carrier 18 (C) | Ring gear 17 (R) | Ring gear 175 ($R_{10}'$) | Sun gear 173 ($S_{10}'$) | Carrier 176 ($C_{10}'$) |
| L-1 | | 1 | 0 | $R=R_{10}'$ | | 0 | |
| L-2 | 0 | 1 | | $R=R_{10}'$ | | 0 | |
| L-3 | 1 | 1 | | $R=R_{10}'$ | | 0 | |
| H-1 | | 1 | 0 | $R=R_{10}'$ | | 1 | |
| H-2 | 0 | 1 | | $R=R_{10}'$ | | 1 | |
| H-3 | 1 | 1 | | $R=R_{10}'$ | | 1 | |
| Rearward | 1 | | 0 | $R=R_{10}'$ | | 0 | | second planetary gear assembly $P_2$ and the relative dimensions thereof are the same as these of the modification of FIG. 9 as described hereinbefore referring to both FIGS. 9 and 10.

Then, the operative conditions of each brake and clutch of this embodiment in each operative stage can be easily understood from Table 8, by making the following substitution.

Figure 28:
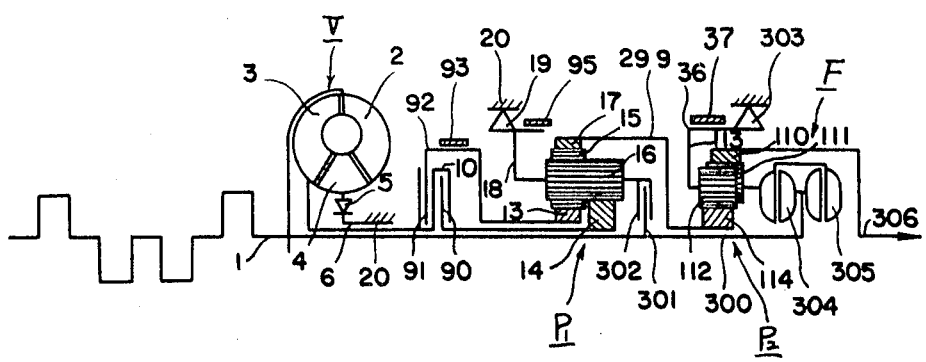
FIG. 28 is a skeleton diagram of a third embodiment of the speed change gear according to the present invention, which can be used in alignment with the crankshaft of an engine and has input and output shaft disposed at opposite ends thereof.

| | In FIG. 28 | In FIG. 9 |
|---|---|---|
| Clutch | 301, 302 | 41, 43 |
| Fluid coupling | 304, 305 | 41, 42 (clutch) |

TABLE 12

| Operative stage | Figure 26, 27 | Clutch 10, 170, 229, 230 | Brake 22, 231 | Clutch 10, 11, 225, 226 | One-way clutch 19 | Brake 171 | One-way clutch 177 | Brake 37 | Clutch 41, 42, 221, 222 | Formula | Speed reduction ratio Numerical example $l_1=2.6$ $l_2=2.2$ $l_{10}=2.0$ |
|---|---|---|---|---|---|---|---|---|---|---|---|
| L-1 | | | Actuated | Engaged | Actuated | Actuated | Actuated | | | $\frac{(l_{10}+1)l_2}{l_{10}}$ | 3.30 |
| L-2 | | Actuated | | do | | do | do | do | | $\frac{(l_{10}+1)(l_1+l_2)}{(l_1+1)l_{10}}$ | 2.00 |
| L-3 | Engaged | | | do | | | do | do | | $\frac{l_{10}+1}{l_{10}}$ | 1.50 |
| H-1 | | | | do | Engaged | Actuated | | | Engaged | $\frac{(l_{10}+1)l_2}{l_{10}+l_2}$ | 1.57 |
| H-2 | | Actuated | | do | | | | | do | $\frac{(l_{10}+1)(l_1+l_2)}{l_{10}(l_1+1)+l_1+l_2}$ | 1.20 |
| H-3 | Engaged | | | do | | | | | do | 1 | 1.00 |
| Rearward | do | | | | Actuated | | Actuated | | | $\frac{-(l_{10}+1)l_1}{l_{10}}$ | -3.90 |

According to the present invention, it is also possible to take input power from one end of the speed change gear and deliver output power from the opposite end thereof through an output shaft aligned with an engine crankshaft. This arrangement of the speed change gear is suitable for certain type of automobiles, such as racing cars.

In the third embodiment shown in FIG. 28, a first planetary gear assembly $P_1$ is Ravigneaux type and substantially the same as that used in the first example described hereinbefore referring to FIG. 1, and a second planetary gear assembly $P_2$ is a planetary gear assembly having first and second planet gears, as shown in FIG. 10. A ring gear 17 of the first planetary gear assembly $P_1$ is connected to a sun gear 114 of the second planetary gear assembly $P_2$ through a link member 299. The power on the turbine 3 of a torque converter V is transmitted to a first sun gear 13 through a clutch 10, 91 and to a second sun gear through another clutch 10, 90. A transmission shaft 300 is connected to the crankshaft 1 and extends through the axial centerline of the planetary gear assemblies. The power on the transmission shaft 300 is delivered to a carrier 18 of the planetary gear assembly $P_1$ through a clutch 301, 302 and to a carrier 113 of the second planetary gear assembly $P_2$ through a fluid coupling F. The fluid coupling F has a pump 304 connected to the shaft 300 and a turbine 305 connected to the carrier 113. The carrier 113 is connected to a drum 36 engageable with both a brake 37 and a one-way clutch 303. An output shaft 306 is connected to a ring gear 110 of the second planetary gear assembly $P_2$ and disposed in alignment with the axial centerline of the first and second planetary gear assemblies, as shown in the figure.

Let it be assumed that the revolving speed of each rotary element of the first planetary gear assembly $P_1$ and the relative dimension thereof in the third embodiment are same as those of the first embodiment described hereinbefore referring to FIG. 1, and the revolving speeds of the rotary elements of the As shown in Table 8, the speed change gear of FIG. 28 can be operated at 8 different forward stages and one rearward stage of speed reduction ratio.

The speed change gear, as shown in FIG. 28, however, can be simplified by eliminating the clutch 301, 302 for the use as a speed change gear operable in six forward stages and a rearward stage. When such simplification is made, the gear ratio of the second planetary gear assembly $P_2$ should be changed from that before the modification. The operative conditions of various clutches and brakes of the thus simplified speed change gear in each operative stage are shown in Table 13. The derivation of the formulas representing the speed reduction ratios is apparent to those skilled in the art.

As numerical examples of the speed reduction ratios, calculation was made by assuming (1) $l_1=2.6$, $l_2=2.2$, and $l_{50}'=1.8$; and (2) $l_1=2.1$, $l_2=2.4$, and $l_{50}'=1.9$; and the results are shown in Table 13. It is apparent from Table 13 that with the simplified speed change gear, the so-called overdrive cannot be achieved.

Figure 29:
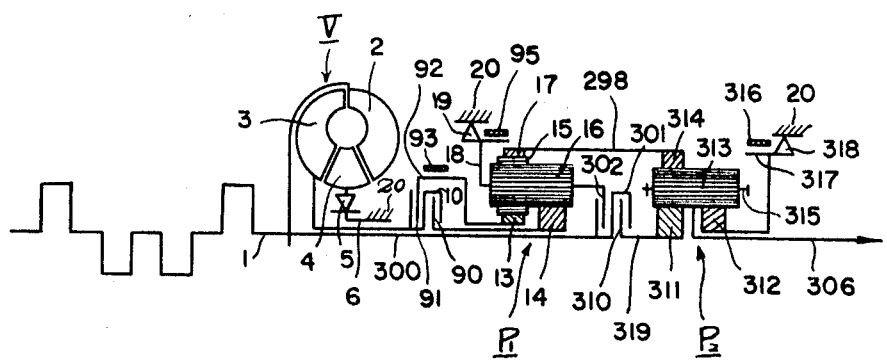
FIG. 29 is a skeleton diagram of a modification of the third embodiment, which does not use a fluid coupling.

FIG. 29 shows a modification of the third embodiment, which uses a Ravigneaux-type planetary gear assembly as $P_1$ and a different planetary gear assembly as $P_2$. A second planetary gear assembly $P_2$ of this modification comprises a first sun gear 311 connected to a transmission shaft 300 through a clutch 301, 310 associated with a shaft 319, a second sun gear 312 having a drum 317 engageable with a one-way clutch 318 and a brake 316, planet gears 313, a ring gear 314 connected to a ring gear of the first planetary gear assembly $P_1$ through a link member 298, and a carrier 315 carrying the planet gears 313 and connected to an output shaft 306.

The power on an engine crankshaft 1 is transmitted to the first plane gear assembly $P_1$ through clutches 10, 90 and 10, 91 and to the second planetary gear assembly through a clutch 301, 310. The power is also delivered to a carrier 18 of the first planetary gear assembly $P_1$ through a clutch 301, 302.

TABLE 13

| Operative stage | Brake 93 | Clutch 10, 90 | One-way clutch 19 | Brake 37 | Fluid coupling 304, 305 | Clutch 10, 91 | Brake 95 | Formula | Speed reduction ratio Example $l_1=2.6$ $l_2=2.2$ $l_{50}'=1.8$ | Example $l_1=2.1$ $l_2=2.4$ $l_{50}'=1.9$ |
|---|---|---|---|---|---|---|---|---|---|---|
| L-1 | | Engaged | Actuated | Actuated | | | Actuated | $l_{50}'l_2$ | 3.96 | 4.56 |
| L-2 | Actuated | do | | do | | | | $l_{50}'(l_1+l_2)/(l_1+1)$ | 2.40 | 2.76 |
| L-3 | | do | | do | | Engaged | | $l_{50}'$ | 1.80 | 1.90 |
| H-1 | | do | Actuated | | Engaged | | Actuated | $l_{50}'l_2/\{1+l_2(l_{50}'-1)\}$ | 1.43 | 1.44 |
| H-2 | Actuated | do | | | do | | | $\dfrac{l_{50}'(l_1+l_2)}{1+l_{50}'l_1+l_{50}'l_2-l_2}$ | 1.16 | 1.20 |
| H-3 | | do | | | do | do | | 1 | 1.00 | 1.00 |
| Rearward | | | Actuated | | do | | Actuated | $-l_{50}'l_1$ | -4.68 | -4.00 |

In order to derive formulas representing speed reduction ratios in each operative stage, let it be assumed that the revolving speeds of various rotary elements and relative dimensions thereof in the first planetary gear assembly $P_1$ of this modification are designated by the corresponding symbols used in the first embodiment described hereinbefore referring to FIG. 1. In the second planetary gear assembly, the following symbols are assumed.

$R_{60}'$: Revolving speed of the ring gear 314
$S_{60}'$: Revolving speed of the first and second sun gears 311 and 312
$C_{60}'$: Revolving speed of the carrier 315

$$l_{60} = \frac{\text{Pitch circle radius of the ring gear 314}}{\text{Pitch circle radius of the first sun gear 311}}$$

In this particular modification, the pitch circle radius of the first sun gear 311 is the same as that of the second sun gear 312.

Then, there are following relations among such revolving speeds of various rotary elements.

$(l_1+1)C = l_1R + S_1$ (1)
$(l_2-1)C = l_2R - S_2$ (2)
$(l_{60}+1)C_{60}' = l_{60}R_{60}' + S_{60}'$ (61)
$R = R_{60}'$ (62)
$M = 1/C_{60}'$ (63)

By rearranging the formulas (1), (2), (61), (62), and (63), the speed reduction ratio M can be given as follows.

$$M = \frac{l_{60}+1}{l_{60}R_{60}' + S_{60}'}$$

$$= \frac{l_{60}+1}{\dfrac{l_{60}}{l_2}[(l_2-1)C + S_2] + S_{60}'} \quad (64)$$

$$= \frac{l_{60}+1}{l_{60}\left[\dfrac{1+l_1}{l_1+l_2}S_2 + \dfrac{l_2-1}{l_1+l_2}S_1\right] + S_{60}'} \quad (65)$$

$$= \frac{l_{60}+1}{\dfrac{l_{60}}{l_1}[(l_1+1)C - S_1] + S_{60}'} \quad (66)$$

The operative conditions of various brakes and clutches in each operative stage are shown in Table 15. If the revolving speed of those elements which rotate at the same speed with the crankshaft 1 is represented by "1," and that of those elements which are held stationary by the brake is represented by "0," then the specific revolving speeds of various rotary elements of the speed change device in each operative stage can be summarized as shown in Table 14.

TABLE 14

| | Revolving speed | | | | | |
|---|---|---|---|---|---|---|
| | First planetary gear assembly $P_1$ | | | | Second planetary gear assembly $P_2$ | |
| Operative stage | First sun gear 13 ($S_1$) | Second sun gear 14 ($S_2$) | Carrier 18 (C) | Ring gear 17 (R) | Ring gear 314 ($R_{60}'$) | Sun gear 311 ($S_{60}'$) |
| L-1 | | 1 | 0 | $R=R_{60}'$ | | 0 |
| L-2 | 0 | 1 | | $R=R_{60}'$ | | 0 |
| L-3 | | 1 | 1 | $R=R_{60}'$ | | 0 |
| L-4 | 0 | | 1 | $R=R_{60}'$ | | 0 |
| H-1 | | 1 | 0 | $R=R_{60}'$ | | 1 |
| H-2 | 0 | 1 | | $R=R_{60}'$ | | 1 |
| H-3 | | 1 | 1 | $R=R_{60}'$ | | 1 |
| H-4 | 0 | | 1 | $R=R_{60}'$ | | 1 |
| Rearward | 1 | | 0 | $R=R_{60}'$ | | 0 |

TABLE 15

| Creative stage | Clutch 10, 91 | Brake 93 | Clutch 10, 90 | One-way clutch 19 | Brake 95 | Clutch 301, 302 | One-way clutch 318 | Brake 316 | Clutch 301, 310 | Formula | Speed reduction ratio Numerical example $l_1=2.6$ $l_2=2.2$ $l_{60}=2.0$ |
|---|---|---|---|---|---|---|---|---|---|---|---|
| L-1 | | | Engaged | Actuated | Actuated | | Actuated | Actuated | | $\dfrac{(l_{60}+1)l_2}{l_{60}}$ | 3.30 |
| L-2 | | Actuated | do | | | | do | do | | $\dfrac{(l_{60}+1)(l_1+l_2)}{l_{60}(l_1+1)}$ | 2.00 |
| L-3 | | | do | | | Engaged | do | do | | $\dfrac{l_{60}+1}{l_{60}}$ | 1.50 |
| L-4 | | Actuated | | | | do | do | do | | $\dfrac{(l_{60}+1)l_1}{l_{60}(l_1+1)}$ | 1.03 |
| H-1 | | | Engaged | Actuated | Actuated | | | | Engaged | $\dfrac{(l_{60}+1)l_2}{l_{60}+l_2}$ | 1.57 |
| H-2 | | Actuated | do | | | | | do | | $\dfrac{(l_{60}+1)(l_1+l_2)}{l_{60}(l_1+1)+l_1+l_2}$ | 1.20 |
| H-3 | | | do | | | Engaged | | do | | 1 | 1 |
| H-4 | | Actuated | | | | do | | do | | $\dfrac{(l_{60}+1)l_1}{l_{60}(l_1+1)+l_1}$ | 0.80 |
| Rearward | | Engaged | | | Actuated | | | Actuated | | $\dfrac{-(l_{60}+1)l_1}{l_{60}}$ | -3.90 |

The formulas of Table 15 representing speed reduction ratios in each operative stage can be easily derived from the formulas (64), (65), and (66) by substituting the relations of Table 14. As a numerical example, the speed reduction ratios were calculated by assuming $l_1=2.6$, $l_2=2.2$, and $l_{60}=2.0$, and the results are shown in Table 15.

In the speed change gear of FIG. 29, if the clutches 301, 302 is eliminated and transmission shafts 300 and 319 are connected directly, the speed change gear can be operated at six forward stages and a rearward stage of speed reduction ratio. Judging from Table 14, the speed reduction ratio in the L-3 stage is similar to that of H-1 stage. Accordingly, if the switchover operation between the high speed range and the low speed range is done manually, the mechanical shock following such manual switchover operation will be very small, because of the aforesaid closeness of the speed reduction ratios in the L-3 and H-1 stages.

It should be noted here that the speed change gears of FIGS. 28 and 29 can be so modified as to reduce the mechanical shock due to shift of the stages of speed reduction ratio and to simplify the transmission shaft between the torque converter and the clutch means. For that purpose, the transmission shaft 300 of the transmission gears of FIGS. 28 and 29 can be connected not to the pump 2 but directly in the turbine 3 of the torque converter V, as in the case of the preceding example shown in FIG. 16.

Figure 30:
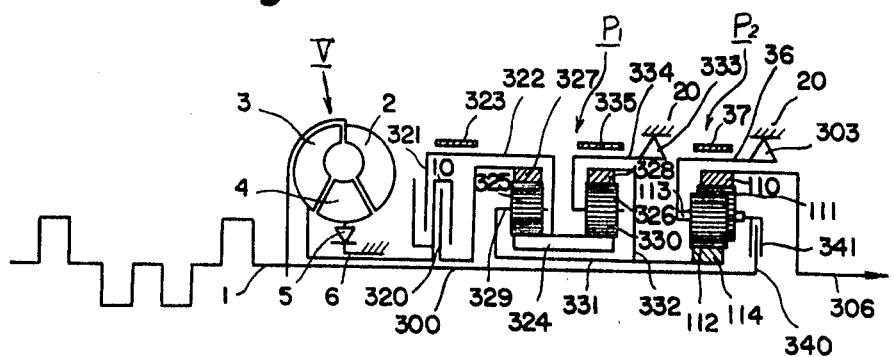
FIG. 30 is a skeleton diagram of a fourth embodiment of the present invention, which does not use a Ravigneaux-type planetary gear assembly.

FIG. 30 shows a fourth embodiment of the present invention, in which no Ravigneaux-type planetary gear assembly is used. The first planetary gear assembly $P_1$ of this embodiment is made by incorporating two sets of simple planetary gear assemblies as shown in FIG. 19 by bonding the sun gears of the sets integrally as a single sun gear. More particularly, the planetary gear assembly $P_1$ comprises a sun gear 324 connected to a clutch plate 321 through a drum 322, first and second planet gears 325 and 326, both meshed with the sun gear 324, a first ring gear 327 meshed with the first planet gears 325, a second ring gear 328 meshed with the second planet gears 326, a first carrier 329 carrying the first planet gears 325 rotatably, and a second carrier 330 carrying the second planet gears 326 rotatably. The first carrier 329 is connected to the sun gear 114 of a second planetary gear assembly $P_2$ through a link member 331. The second ring gear 328 is also connected to the link member 331 through another link element 32. The second carrier 330 is connected to a drum 334 engageable with both a brake 335 and a one-way clutch 333. The one-way clutch 333 allows normal rotation of the carrier 330 but not the reverse rotation thereof. The brake 335 selectively stops the carrier 330 stationary.

The second planetary gear assembly $P_2$ of this fourth embodiment is the same as shown in FIG. 10, and the rotary elements thereof are designated by the same symbols.

The fourth embodiment, as shown in FIG. 30, can be operated in six forward stages and one rearward stage, but it cannot be operated in eight stages. The operative conditions of various brakes and clutches of the fourth embodiment in each operative stage thereof is shown in Table 17. In this speed change gear, the switchover operation between the high speed range and the low speed range is done manually by means of a clutch 340, 341, which connects a transmission shaft 300 issuing from the engine crankshaft 1 to a carrier 113 of the second planetary gear assembly $P_2$. The carrier 113 is engageable with a brake 37 and a one-way clutch 303. The shifting of operative stages within each high speed or low speed range is done automatically by a governor (not shown) and a hydraulic means (not shown).

In order to derive formulas representing speed reduction ratios in each operative stage, the following symbols are assumed.

In the first planetary gear assembly $P_1$:

$R_{31}$: Revolving speed of the first ring gear 327
$R_{32}$: Revolving speed of the second ring gear 328
$S_{30}$: Revolving speed of the sun gear 324
$C_{31}$: Revolving speed of the first carrier 329
$C_{32}$: Revolving speed of the second carrier 330

$$l_{31} = \frac{\text{Pitch circle radius of the first ring gear 327}}{\text{Pitch circle radius of the sun gear 324}}$$

$$l_{32} = \frac{\text{Pitch circle radius of the second ring gear 328}}{\text{Pitch circle radius of the sun gear 324}}$$

In the second planetary gear assembly $P_2$:
$R_{70}'$: Revolving speed of the ring gear 110
$S_{70}'$: Revolving speed of the sun gear 114
$C_{70}'$: Revolving speed of the carrier 113

$$l_{70} = \frac{\text{Pitch circle radius of the ring gear 110}}{\text{Pitch circle radius of the sun gear 114}}$$

Then, there are the following relations among such revolving speeds.

$$(l_{31}+1)C_{31} = l_{31}R_{31} + S_{30} \tag{71}$$

$$(l_{32}+1)C_{32} = l_{32}R_{32} + S_{30} \tag{72}$$

$$(l_{70}-1)C_{70}' = l_{70}R_{70}' - S_{70}' \tag{73}$$

$$R_{32} = S_{70}' = C_{31} \tag{74}$$

$$M = 1/R_{70}' = \frac{l_{70}}{(l_{70}-1)C_{70}' + S_{70}'} \tag{75}$$

$$M = \frac{l_{70}}{(l_{70}-1)C_{70}' + \dfrac{l_{31}R_{31} + (l_{32}+1)C_{32}}{l_{31}+l_{32}+1}} \tag{76}$$

$$= \frac{l_{70}}{(l_{70}-1)C' + \dfrac{l_{31}R_{31} + S_{30}}{l_{31}+1}} \tag{77}$$

$$= \frac{l_{70}}{(l_{70}-1)C' + \dfrac{(l_{32}+1)C_{32} - S_{30}}{l_{32}}} \tag{78}$$

If the revolving speed of those elements which rotate at the same speed with the crankshaft 1 is represented by "1," and that of those elements which are held stationary by the brake is represented by "0," then the specific revolving speeds of various rotary elements of the speed change device in each operative stage can be summarized as shown in Table 16.

TABLE 16

| Operative stage | First planetary gear assembly $P_1$ | | | | Second planetary gear assembly $P_2$ | |
|---|---|---|---|---|---|---|
| | Sun gear 325 ($S_{30}$) | First ring gear 327 ($R_{31}$) | Second carrier 330 ($C_{32}$) | Second ring gear 328 ($R_{32}$) | Sun gear 114 ($S_{70}'$) | Carrier 113 ($C_{70}'$) |
| L-1 | | 1 | 0 | $R_{32}=S_{70}'$ | | 0 |
| L-2 | 0 | 1 | | $R_{32}=S_{70}'$ | | 0 |
| L-3 | 1 | 1 | | $R_{32}=S_{70}'$ | | 0 |
| H-1 | | 1 | 0 | $R_{32}=S_{70}'$ | | 1 |
| H-2 | 0 | 1 | | $R_{32}=S_{70}'$ | | 1 |
| H-3 | 1 | 1 | | $R_{32}=S_{70}'$ | | 1 |
| Rearward | 1 | | 0 | $R_{32}=S_{70}'$ | | 0 |

The formulas representing speed reduction ratios can be easily derived from the formulas (76), (77), and (78) by substituting the relations of Table 17 for each operative stage. By assuming $l_{31}=l_{32}$, such formulas are simplified and the results are shown in Table 17.

As a numerical example, the speed reduction ratios were calculated by assuming $l_{31}=l_{32}=2.18$ and $l_{70}=1.9$, and the results are shown in Table 17.

As described in the foregoing, according to the present invention, by arranging planetary gear assemblies, clutches, and brakes in a suitable manner, speed change gears of simple construction, which are operable in eight or six forward stages and one rearward stage, can be manufactured with ease.

TABLE 17

| Operative stage | Clutch 10, 321 | Brake 323 | Clutch 10, 320 | One-way clutch 333 | Brake 335 | One-way clutch 303 | Brake 37 | Clutch 340, 341 | Formula | Speed reduction ratio — Numerical example $l_{31}=l_{32}=2.18$ $l_{70}=1.9$ |
|---|---|---|---|---|---|---|---|---|---|---|
| L-1 | | | Engaged | Actuated | Actuated | Actuated | Actuated | | $\dfrac{l_{70}(2l_{31}+1)}{l_{31}}$ | 4.68 |
| L-2 | | Actuated | do | | | do | do | | $\dfrac{l_{70}(l_{31}+1)}{l_{31}}$ | 2.77 |
| L-3 | Engaged | | do | | | do | do | | $l_{70}$ | 1.90 |
| H-1 | | | do | Actuated | Actuated | | | Engaged | $\dfrac{l_{70}(2l_{31}+1)}{l_{70}(2l_{31}+1)-(l_{31}+1)}$ | 1.45 |
| H-2 | | Actuated | do | | | | | do | $\dfrac{l_{70}(l_{31}+1)}{l_{70}(l_{31}+1)-1}$ | 1.20 |
| H-3 | Engaged | | do | | | | | do | 1 | 1.00 |
| Rearward | | do | | Actuated | | Actuated | | | $-l_{70}l_{31}$ | -4.15 |

Even though the speed change gear of the present invention has been described in detail referring to automobile speed reduction gears, however, it is apparent that such speed change gears can be applied to any machinery utilizing output power of prime movers in different stages of speed reduction ratio.

By providing an automatic multistage speed change gear which can meet various layout requirements by simple modifications, the present invention contribute greatly to the industry.

Although the present invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:

1. An automatic speed change gear comprising an input shaft, a hydraulic torque converter connected to said input shaft, a Ravigneaux-type first planetary gear assembly, said Ravigneaux-type first planetary gear assembly comprising a plurality of rotary elements including a first and second sun gear, a rotatable carrier, at least one first and second planet gears rotatably mounted on said carrier, said first planet gear meshing with said first sun gear and said second planet gear meshing with said second sun gear and said first planet gear, and a ring gear meshing with said first planet gear, a second planetary gear assembly positioned in axial alignment with said first planetary gear assembly and comprising a plurality of rotary elements including a sun gear, a ring gear, a rotatable carrier, and at least one first and second planet gears rotatably mounted on said carrier member, said first planet gear meshing with said sun gear and said second planet gear meshing with said first planet gear and with said ring gear, said sun gear of said second planetary gear set being drivingly connected to said ring gear of said first planetary gear assembly, first clutch means including at least one clutch connecting said Ravigneaux-type first planetary gear assembly to said torque converter, first brake means selectively engageable with rotary elements of said first planetary gear assembly, a second brake means selectively engageable with a rotary element of said second planetary gear assembly, second clutch means including at least one clutch connecting said second planetary gear assembly to said input shaft, third clutch means operatively connecting said input shaft to said first planetary gear assembly and, an output means connected to the ring gear of said second planetary gear assembly, said first planetary gear assembly being adapted to transmit input power from said torque converter to said second planetary gear assembly in at least four forward stages and a rearward stage, said second planetary gear assembly being adapted to deliver output power to said output means in at least four forward low speed stages and a rearward stage when said second brake means is actuated, and in at least four forward high speed stages when said second clutch means is actuated.

2. An automatic speed change gear as claimed in claim 1, wherein said input shaft comprises an engine crankshaft positioned parallel to and spaced radially from the longitudinal axis of said planetary gear sets, one end of said engine crankshaft being connected to said torque converter and the other end thereof being operatively connected with said second clutch means.

3. An automatic speed change gear as claimed in claim 2 further comprising, a fluid coupling operatively connected between said engine crankshaft and said second clutch means.

4. An automatic speed change gear as claimed in claim 1, wherein said input shaft is positioned parallel to and spaced radially outwardly from the longitudinal axis of said planetary gear sets, one end of said input shaft being connected with said torque converter and the other end of said input shaft being connected with said second clutch means.

5. An automatic speed change gear as claimed in claim 1, wherein said input shaft is comprised of an engine crankshaft portion on one side of said torque converter and an additional portion on the other side of said torque converter positioned parallel to and spaced radially from the longitudinal axis of said planetary gear sets, one end of said additional portion of said input shaft being connected with the turbine of said torque converter and the other end of said additional portion of said input shaft being operatively connected with said first clutch means, said second clutch means being positioned axially between said torque converter and said second planetary gear set, with said second planetary gear set being positioned axially between said second clutch means and said first planetary gear set, the pump of said torque converter being operatively connected with said second clutch means.

6. An automatic speed change gear as claimed in claim 1, wherein said torque converter and said first and second planetary gear sets are in axial alignment with each other, said input shaft being positioned along the longitudinal axis of said planetary gear sets and having one end thereof operatively connected with the pump of said torque converter and the other end thereof operatively connected with said second clutch means, said first planetary gear set being positioned axially between said torque converter and said second planetary gear sets and said first clutch means being positioned axially between said torque converter and said first planetary gear set.

7. An automatic speed change gear as claimed in claim 6, said third clutch means being positioned axially between said first and said second planetary gear sets adjacent said first planetary gear set and said second planetary gear set is positioned axially between said second and said third clutch means.

8. An automatic speed change gear as claimed in claim 7, wherein said second clutch means comprises a fluid coupling, and said output means is in axial alignment with the longitudinal axis of said input shaft.